US008673142B2

(12) United States Patent
Woodard et al.

(10) Patent No.: US 8,673,142 B2
(45) Date of Patent: Mar. 18, 2014

(54) SYSTEM FOR ENHANCING A WASTEWATER TREATMENT PROCESS

(71) Applicant: Siemens Industry, Inc., Alpharetta, GA (US)

(72) Inventors: Steven E. Woodard, Cumberland, ME (US); Peter G. Marston, Ipswich, MA (US); Ionel Wechsler, Framingham, MA (US)

(73) Assignee: Siemens Water Technologies LLC, Alpharetta, GA (US)

( * ) Notice: Subject to any disclaimer, the term of this patent is extended or adjusted under 35 U.S.C. 154(b) by 0 days.

(21) Appl. No.: 13/946,204

(22) Filed: Jul. 19, 2013

(65) Prior Publication Data

US 2013/0299401 A1 Nov. 14, 2013

Related U.S. Application Data

(63) Continuation of application No. 13/461,641, filed on May 1, 2012, now Pat. No. 8,506,800, which is a continuation of application No. 12/584,545, filed on Sep. 8, 2009, now Pat. No. 8,470,172, which is a continuation-in-part of application No. 12/008,216, filed on Jan. 9, 2008, now Pat. No. 7,695,623.

(60) Provisional application No. 60/879,373, filed on Jan. 9, 2007, provisional application No. 60/994,553, filed on Sep. 20, 2007.

(51) Int. Cl.
*B01D 24/00* (2006.01)

(52) U.S. Cl.
USPC ........ 210/189; 210/197; 210/198.1; 210/222; 210/512.1; 210/173

(58) Field of Classification Search
USPC ............ 210/189, 197, 198.1, 222, 512.1, 173
See application file for complete search history.

(56) References Cited

U.S. PATENT DOCUMENTS

| 438,579 A | 10/1890 | Faunce et al. |
| 531,183 A | 12/1894 | Harris |
| 653,010 A | 7/1900 | Koyl |

(Continued)

FOREIGN PATENT DOCUMENTS

| CN | 1686862 A | 10/2005 |
| CN | 101186410 A | 5/2008 |

(Continued)

OTHER PUBLICATIONS

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

(Continued)

*Primary Examiner* — Chester Barry

(57) ABSTRACT

A system for enhancing an activated sludge process including at least one biological reactor. A weighting agent impregnation subsystem is coupled to the biological reactor for mixing biological flocs and weighting agent to impregnate the weighting agent into the biological flocs to form weighted biological flocs. A weighting agent recovery subsystem is configured to recover the weighting agent from the weighted biological flocs and reintroducing the recovered weighting agent to the weighting agent impregnation subsystem.

13 Claims, 14 Drawing Sheets

(56) References Cited

U.S. PATENT DOCUMENTS

| | | | |
|---|---|---|---|
| 728,062 | A | 5/1903 | Wilson |
| 1,064,807 | A | 6/1913 | Yost |
| 1,310,461 | A | 7/1919 | Williams |
| 1,383,287 | A | 7/1921 | Campbell |
| 1,401,288 | A | 12/1921 | Sodeau |
| 1,948,080 | A | 2/1934 | Thomas |
| 2,065,123 | A | 12/1936 | Downes |
| 2,129,267 | A | 9/1938 | Fischer |
| 2,232,294 | A | 2/1941 | Urbain et al. |
| 2,232,296 | A | 2/1941 | Urbain et al. |
| 2,268,461 | A | 12/1941 | Nichols |
| 2,326,575 | A | 8/1943 | Stearns |
| 2,359,748 | A | 10/1944 | Clemens |
| 2,391,494 | A | 12/1945 | Walker |
| 2,401,924 | A | 6/1946 | Goetz |
| 2,564,515 | A | 8/1951 | Vogel |
| 2,597,561 | A | 5/1952 | Blind |
| 2,652,925 | A | 9/1953 | Vermeiren |
| 2,713,028 | A | 7/1955 | Jenks |
| 2,758,715 | A | 8/1956 | Fowler |
| 2,825,464 | A | 3/1958 | Mack |
| 2,945,590 | A | 7/1960 | Stearns |
| 3,066,095 | A | 11/1962 | Hronas |
| 3,080,264 | A | 3/1963 | Zimmie |
| 3,142,638 | A | 7/1964 | Blaisdell et al. |
| 3,228,878 | A | 1/1966 | Moody |
| 3,350,302 | A | 10/1967 | Demeter et al. |
| 3,575,852 | A | 4/1971 | Hughes |
| 3,617,561 | A | 11/1971 | Fanselow |
| 3,622,461 | A | 11/1971 | Wagner et al. |
| 3,627,678 | A | 12/1971 | Marston et al. |
| 3,676,337 | A | 7/1972 | Kolm |
| 3,690,454 | A | 9/1972 | Bekhtle et al. |
| 3,693,795 | A | 9/1972 | Robinson et al. |
| 3,697,420 | A | 10/1972 | Blaisdell et al. |
| 3,767,351 | A | 10/1973 | Blaser |
| 3,819,589 | A | 6/1974 | Fauke et al. |
| 3,856,666 | A | 12/1974 | Yashima et al. |
| 3,886,064 | A | 5/1975 | Kosonen |
| 3,887,457 | A | 6/1975 | Marston et al. |
| 3,920,543 | A | 11/1975 | Marston et al. |
| 3,929,632 | A | 12/1975 | Buriks et al. |
| 3,929,635 | A | 12/1975 | Buriks et al. |
| 3,950,319 | A | 4/1976 | Schmidt et al. |
| 3,951,807 | A | 4/1976 | Sanderson |
| 3,959,133 | A | 5/1976 | Fulton |
| 3,983,033 | A | 9/1976 | de Latour |
| 4,024,040 | A | 5/1977 | Phalangas et al. |
| 4,025,432 | A | 5/1977 | Nolan et al. |
| 4,033,864 | A | 7/1977 | Nolan et al. |
| 4,046,681 | A | 9/1977 | Marston et al. |
| 4,066,991 | A | 1/1978 | Marston et al. |
| 4,089,779 | A | 5/1978 | Neal |
| 4,110,208 | A | 8/1978 | Neal |
| 4,139,456 | A | 2/1979 | Yabuuchi et al. |
| 4,142,970 | A | 3/1979 | von Hagel et al. |
| 4,151,090 | A | 4/1979 | Brigante |
| 4,153,559 | A | 5/1979 | Sanderson |
| 4,167,480 | A | 9/1979 | Mach |
| 4,176,042 | A | 11/1979 | Fahlstrom |
| 4,190,539 | A | 2/1980 | Besik |
| 4,193,866 | A | 3/1980 | Slusarczuk et al. |
| 4,204,948 | A | 5/1980 | Wechsler et al. |
| 4,274,968 | A | 6/1981 | Grutsch et al. |
| 4,290,898 | A | 9/1981 | von Hagel et al. |
| 4,297,484 | A | 10/1981 | Quinlan |
| 4,320,012 | A | 3/1982 | Palm et al. |
| 4,339,347 | A | 7/1982 | Quinlan |
| 4,341,657 | A | 7/1982 | Quinlan |
| 4,343,730 | A | 8/1982 | Becker et al. |
| 4,357,237 | A | 11/1982 | Sanderson |
| 4,358,382 | A | 11/1982 | Quinlan |
| 4,359,382 | A | 11/1982 | Morgan |
| 4,377,483 | A | 3/1983 | Yamashita et al. |
| 4,388,195 | A | 6/1983 | von Hagel et al. |
| 4,402,833 | A | 9/1983 | Bennett et al. |
| 4,454,047 | A | 6/1984 | Becker et al. |
| 4,465,597 | A | 8/1984 | Herman et al. |
| 4,482,459 | A | 11/1984 | Shiver |
| 4,502,958 | A | 3/1985 | Sasaki |
| 4,522,643 | A | 6/1985 | Quinlan |
| 4,563,286 | A | 1/1986 | Johnson et al. |
| 4,579,655 | A | 4/1986 | Louboutin et al. |
| 4,588,508 | A | 5/1986 | Allenson et al. |
| 4,595,506 | A | 6/1986 | Kneer |
| 4,654,139 | A | 3/1987 | Baba et al. |
| 4,655,933 | A | 4/1987 | Johnson et al. |
| 4,686,035 | A | 8/1987 | Estabrook |
| 4,689,154 | A | 8/1987 | Zimberg |
| 4,699,951 | A | 10/1987 | Allenson et al. |
| 4,735,725 | A | 4/1988 | Reischl et al. |
| 4,752,401 | A | 6/1988 | Bodenstein |
| 4,765,900 | A | 8/1988 | Schwoyer et al. |
| 4,765,908 | A | 8/1988 | Monick et al. |
| 4,783,265 | A | 11/1988 | Timmons |
| 4,795,557 | A | 1/1989 | Bourbigot et al. |
| 4,827,890 | A | 5/1989 | Pociask et al. |
| 4,843,105 | A | 6/1989 | Reischl et al. |
| 4,849,128 | A | 7/1989 | Timmons et al. |
| 4,851,123 | A | 7/1989 | Mishra |
| 4,864,075 | A | 9/1989 | Thompson et al. |
| 4,872,993 | A | 10/1989 | Harrison |
| 4,874,508 | A | 10/1989 | Fritz |
| 4,882,064 | A | 11/1989 | Dixon et al. |
| 4,921,597 | A | 5/1990 | Lurie |
| 4,921,613 | A | 5/1990 | Nordberg et al. |
| 4,927,543 | A | 5/1990 | Bablon et al. |
| 4,938,876 | A | 7/1990 | Ohsol |
| 4,940,550 | A | 7/1990 | Watson |
| 4,944,278 | A | 7/1990 | Woodard |
| 4,944,279 | A | 7/1990 | Woodard |
| 4,956,099 | A | 9/1990 | Thompson et al. |
| 4,981,593 | A * | 1/1991 | Priestley et al. ............ 210/613 |
| 5,009,791 | A | 4/1991 | Lin et al. |
| 5,013,451 | A | 5/1991 | Thompson et al. |
| 5,019,274 | A | 5/1991 | Thompson et al. |
| 5,023,012 | A | 6/1991 | Buchan et al. |
| 5,026,483 | A | 6/1991 | Thompson et al. |
| 5,055,194 | A | 10/1991 | Goetz et al. |
| 5,064,531 | A | 11/1991 | Wang et al. |
| 5,069,783 | A | 12/1991 | Wang et al. |
| 5,084,733 | A | 1/1992 | Katoh et al. |
| 5,089,120 | A | 2/1992 | Eberhardt |
| 5,089,227 | A | 2/1992 | Thompson et al. |
| 5,089,619 | A | 2/1992 | Thompson et al. |
| 5,112,494 | A | 5/1992 | Yan |
| 5,112,499 | A | 5/1992 | Murray et al. |
| 5,149,438 | A | 9/1992 | Hebert |
| 5,187,326 | A | 2/1993 | Shirai |
| 5,234,603 | A | 8/1993 | Potts |
| 5,266,200 | A | 11/1993 | Reid |
| 5,298,168 | A | 3/1994 | Guess |
| 5,310,642 | A | 5/1994 | Vargas et al. |
| 5,369,072 | A | 11/1994 | Benjamin et al. |
| 5,377,845 | A | 1/1995 | Hamen et al. |
| 5,383,539 | A | 1/1995 | Bair et al. |
| 5,395,527 | A | 3/1995 | Desjardins |
| 5,397,476 | A | 3/1995 | Bradbury et al. |
| 5,462,670 | A | 10/1995 | Guess |
| 5,545,330 | A | 8/1996 | Ehrlich |
| 5,560,493 | A | 10/1996 | Perry |
| 5,593,590 | A | 1/1997 | Steyskal |
| 5,595,666 | A | 1/1997 | Kochen et al. |
| 5,596,392 | A | 1/1997 | Danzuka |
| 5,597,479 | A | 1/1997 | Johnson |
| 5,616,250 | A | 4/1997 | Johnson et al. |
| 5,637,221 | A | 6/1997 | Coyne |
| 5,693,461 | A | 12/1997 | Bagchi et al. |
| 5,702,809 | A | 12/1997 | Tixier et al. |
| 5,730,864 | A | 3/1998 | Delsalle et al. |
| 5,731,134 | A | 3/1998 | Honan et al. |
| 5,770,091 | A * | 6/1998 | Binot et al. ............ 210/711 |
| 5,779,908 | A | 7/1998 | Anderson et al. |
| 5,800,717 | A | 9/1998 | Ramsay et al. |

(56) References Cited

U.S. PATENT DOCUMENTS

| | | | |
|---|---|---|---|
| 5,805,965 A | 9/1998 | Tsuda et al. | |
| 5,840,185 A | 11/1998 | Hughes et al. | |
| 5,840,195 A | 11/1998 | Delsalle et al. | |
| 5,856,072 A | 1/1999 | Leone et al. | |
| 5,893,355 A | 4/1999 | Glover et al. | |
| 5,925,290 A | 7/1999 | Hills | |
| 5,976,375 A | 11/1999 | Dorica et al. | |
| 5,976,771 A | 11/1999 | Kosugi et al. | |
| 6,010,631 A | 1/2000 | Delsalle et al. | |
| 6,030,761 A | 2/2000 | Taguchi et al. | |
| 6,093,318 A | 7/2000 | Saho et al. | |
| 6,099,738 A | 8/2000 | Wechsler et al. | |
| 6,149,014 A | 11/2000 | Mankosa et al. | |
| 6,151,467 A | 11/2000 | Yamaguchi | |
| 6,160,976 A | 12/2000 | Karakama et al. | |
| 6,185,393 B1 | 2/2001 | Karakama et al. | |
| 6,210,587 B1 | 4/2001 | Vion | |
| 6,210,588 B1* | 4/2001 | Vion | 210/711 |
| 6,221,253 B1 | 4/2001 | Fukase et al. | |
| 6,221,262 B1 | 4/2001 | MacDonald et al. | |
| 6,228,269 B1 | 5/2001 | Cort | |
| 6,228,565 B1 | 5/2001 | Ohzeki et al. | |
| 6,251,576 B1 | 6/2001 | Taguchi et al. | |
| 6,277,285 B1 | 8/2001 | Vion | |
| 6,290,849 B1 | 9/2001 | Rykaer et al. | |
| 6,379,549 B1 | 4/2002 | LePoder et al. | |
| 6,383,370 B1 | 5/2002 | Keever et al. | |
| 6,386,781 B1 | 5/2002 | Gueret | |
| 6,406,624 B1 | 6/2002 | DeVos | |
| 6,423,485 B1 | 7/2002 | Yamada et al. | |
| 6,432,303 B1 | 8/2002 | Chesner et al. | |
| 6,447,686 B1 | 9/2002 | Choi et al. | |
| 6,472,132 B1 | 10/2002 | Yamada et al. | |
| 6,485,652 B1 | 11/2002 | Le Poder et al. | |
| 6,517,714 B2 | 2/2003 | Streat | |
| 6,576,145 B2 | 6/2003 | Conaway et al. | |
| 6,613,232 B2 | 9/2003 | Chesner et al. | |
| 6,645,386 B1 | 11/2003 | Moreau et al. | |
| 6,689,277 B2 | 2/2004 | Streat | |
| 6,692,173 B2 | 2/2004 | Gueret | |
| 6,706,467 B2 | 3/2004 | Howe et al. | |
| 6,740,245 B2 | 5/2004 | Johnson | |
| 6,759,018 B1 | 7/2004 | Arno et al. | |
| 6,783,679 B1 | 8/2004 | Rozich | |
| 6,811,885 B1 | 11/2004 | Andriessen et al. | |
| 6,824,692 B2 | 11/2004 | Binot et al. | |
| 6,832,691 B2 | 12/2004 | Miles et al. | |
| 6,875,351 B2 | 4/2005 | Arnaud | |
| 6,896,815 B2 | 5/2005 | Cort | |
| 6,902,678 B2 | 6/2005 | Tipton | |
| 6,919,031 B2 | 7/2005 | Blumenschein et al. | |
| 6,923,901 B2 | 8/2005 | Leffler et al. | |
| 6,960,294 B2 | 11/2005 | Arnaud | |
| 6,966,993 B2 | 11/2005 | Binot | |
| 6,968,138 B2 | 11/2005 | Akutsu | |
| 7,001,525 B2 | 2/2006 | Binot et al. | |
| 7,083,715 B2 | 8/2006 | Binot | |
| 7,153,431 B2 | 12/2006 | Daugherty | |
| 7,160,448 B2 | 1/2007 | Johnson | |
| 7,210,581 B2 | 5/2007 | Robinson et al. | |
| 7,244,362 B2 | 7/2007 | Binot | |
| 7,255,793 B2 | 8/2007 | Cort | |
| 7,276,165 B2 | 10/2007 | Morgoun | |
| 7,309,435 B2 | 12/2007 | Rozich | |
| 7,311,841 B2 | 12/2007 | Binot et al. | |
| 7,323,108 B1* | 1/2008 | Garbett et al. | 210/607 |
| 7,407,582 B2 | 8/2008 | Sun | |
| 7,407,593 B2 | 8/2008 | Frederick, Jr. et al. | |
| 7,438,817 B2 | 10/2008 | Nagghappan et al. | |
| 7,449,105 B2 | 11/2008 | Hastings | |
| 7,476,324 B2 | 1/2009 | Ciampi et al. | |
| 7,494,592 B2 | 2/2009 | Deskins | |
| 7,563,366 B2 | 7/2009 | Sun | |
| 7,601,261 B2 | 10/2009 | Palacios Donaque | |
| 7,608,190 B1 | 10/2009 | Banerjee et al. | |
| 7,625,490 B2 | 12/2009 | Cort | |
| 7,648,637 B1 | 1/2010 | Sauvignet et al. | |
| 7,648,638 B2 | 1/2010 | Essemiani et al. | |
| 7,651,620 B2 | 1/2010 | Vion | |
| 7,678,278 B2 | 3/2010 | Binot et al. | |
| 7,686,079 B2 | 3/2010 | Gamache et al. | |
| 7,686,960 B2 | 3/2010 | Cort | |
| 7,691,261 B2 | 4/2010 | Deskins | |
| 7,691,269 B2 | 4/2010 | Cort | |
| 7,695,623 B2 | 4/2010 | Woodard et al. | |
| 7,695,630 B2 | 4/2010 | de Guevara | |
| 7,704,390 B2 | 4/2010 | Leffler et al. | |
| 7,704,399 B2 | 4/2010 | Condit | |
| 7,722,843 B1 | 5/2010 | Srinivasachar | |
| 7,729,778 B2 | 6/2010 | Eggers et al. | |
| 7,820,025 B2 | 10/2010 | Ciampi et al. | |
| 7,820,053 B2 | 10/2010 | Cort | |
| 7,820,054 B2 | 10/2010 | Hastings et al. | |
| 7,828,976 B2 | 11/2010 | Banerjee et al. | |
| 8,012,582 B2* | 9/2011 | Luo et al. | 428/403 |
| 2001/0030160 A1 | 10/2001 | Wechsler et al. | |
| 2002/0003115 A1 | 1/2002 | Conaway et al. | |
| 2002/0017483 A1 | 2/2002 | Chesner et al. | |
| 2002/0030019 A1 | 3/2002 | Keever et al. | |
| 2002/0054783 A1 | 5/2002 | Gueret | |
| 2002/0088758 A1 | 7/2002 | Blumenschein et al. | |
| 2002/0158025 A1 | 10/2002 | Streat | |
| 2002/0170816 A1 | 11/2002 | Leffler et al. | |
| 2002/0185452 A1 | 12/2002 | Johnson | |
| 2002/0190004 A1 | 12/2002 | Wechsler et al. | |
| 2003/0082084 A1 | 5/2003 | Cort | |
| 2003/0089667 A1 | 5/2003 | Binot et al. | |
| 2003/0150817 A1 | 8/2003 | Keever et al. | |
| 2003/0222027 A1 | 12/2003 | Streat | |
| 2003/0224301 A1 | 12/2003 | Howe et al. | |
| 2004/0055959 A1 | 3/2004 | Wechsler et al. | |
| 2004/0055961 A1 | 3/2004 | Binot | |
| 2004/0060876 A1 | 4/2004 | Tipton | |
| 2004/0129642 A1 | 7/2004 | Binot | |
| 2004/0144730 A1 | 7/2004 | Binot et al. | |
| 2004/0206680 A1 | 10/2004 | Johnson | |
| 2004/0213721 A1 | 10/2004 | Arno et al. | |
| 2005/0005471 A1 | 1/2005 | Pan | |
| 2005/0035030 A1 | 2/2005 | Oder et al. | |
| 2005/0045534 A1 | 3/2005 | Kin et al. | |
| 2005/0051488 A1 | 3/2005 | Nagghappan et al. | |
| 2005/0101719 A1 | 5/2005 | Ishihara | |
| 2005/0103719 A1 | 5/2005 | Binot et al. | |
| 2005/0131266 A1 | 6/2005 | Carman et al. | |
| 2005/0173354 A1 | 8/2005 | Binot et al. | |
| 2005/0194311 A1 | 9/2005 | Rozich | |
| 2005/0218056 A1 | 10/2005 | Binot | |
| 2005/0230299 A1 | 10/2005 | Saho et al. | |
| 2005/0258103 A1 | 11/2005 | Cort | |
| 2005/0271575 A1 | 12/2005 | Ciampi et al. | |
| 2005/0277712 A1 | 12/2005 | Daly | |
| 2005/0282144 A1 | 12/2005 | Wechsler et al. | |
| 2006/0006114 A1 | 1/2006 | Deskins | |
| 2006/0018273 A1 | 1/2006 | Yamada et al. | |
| 2006/0108273 A1 | 5/2006 | Perri et al. | |
| 2006/0108283 A1 | 5/2006 | Johnson et al. | |
| 2006/0138047 A1 | 6/2006 | Morgoun | |
| 2006/0175252 A1 | 8/2006 | Upendrakumar et al. | |
| 2006/0186056 A1 | 8/2006 | Ivan | |
| 2006/0213832 A1* | 9/2006 | Hudson et al. | 210/626 |
| 2006/0254770 A1 | 11/2006 | Hou | |
| 2006/0270888 A1 | 11/2006 | Carman et al. | |
| 2006/0289357 A1 | 12/2006 | Wechsler et al. | |
| 2007/0039894 A1 | 2/2007 | Cort | |
| 2007/0062883 A1 | 3/2007 | Frederick et al. | |
| 2007/0108132 A1 | 5/2007 | de Guevara | |
| 2007/0114184 A1 | 5/2007 | Essemiani et al. | |
| 2007/0138093 A1 | 6/2007 | Bossler et al. | |
| 2007/0163955 A1* | 7/2007 | Sun | 210/625 |
| 2008/0019780 A1 | 1/2008 | Hastings | |
| 2008/0073267 A1 | 3/2008 | Cort | |
| 2008/0073268 A1 | 3/2008 | Cort | |
| 2008/0073270 A1 | 3/2008 | Smith | |
| 2008/0073271 A1 | 3/2008 | Cort | |

(56) References Cited

U.S. PATENT DOCUMENTS

| | | |
|---|---|---|
| 2008/0073278 A1 | 3/2008 | Cort |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |
| 2008/0078721 A1 | 4/2008 | Binot et al. |
| 2008/0135491 A1 | 6/2008 | Cort |
| 2008/0156709 A1 | 7/2008 | Johnson |
| 2008/0164183 A1 | 7/2008 | Marston et al. |
| 2008/0164184 A1 | 7/2008 | Marston et al. |
| 2008/0203015 A1 | 8/2008 | Marston et al. |
| 2008/0210613 A1 | 9/2008 | Wechsler et al. |
| 2008/0217244 A1 | 9/2008 | Gaid |
| 2008/0257810 A1* | 10/2008 | Sun .................. 210/195.3 |
| 2008/0272065 A1 | 11/2008 | Johnson |
| 2008/0290030 A1 | 11/2008 | Nagghappan et al. |
| 2008/0296228 A1 | 12/2008 | Sauvignet et al. |
| 2008/0314820 A1 | 12/2008 | Prulhiere et al. |
| 2008/0314830 A1 | 12/2008 | Banerjee et al. |
| 2009/0047076 A1 | 2/2009 | Hastings |
| 2009/0050570 A1 | 2/2009 | Sauvignet |
| 2009/0065404 A1 | 3/2009 | Paspek, Jr. et al. |
| 2009/0084730 A1 | 4/2009 | Mabille et al. |
| 2009/0098262 A1 | 4/2009 | Mabille et al. |
| 2009/0127180 A1 | 5/2009 | Deskins |
| 2009/0178979 A1 | 7/2009 | Hastings et al. |
| 2009/0206040 A1 | 8/2009 | Berg et al. |
| 2009/0218281 A1 | 9/2009 | Sauvignet et al. |
| 2009/0261037 A1 | 10/2009 | Clifford, III et al. |
| 2009/0272693 A1 | 11/2009 | Mabille et al. |
| 2009/0299143 A1 | 12/2009 | Conlon et al. |
| 2009/0301948 A1 | 12/2009 | Essemiani et al. |
| 2009/0308815 A1 | 12/2009 | Sauvignet et al. |
| 2010/0038081 A1 | 2/2010 | Gamache et al. |
| 2010/0057085 A1 | 3/2010 | Holcomb et al. |
| 2010/0072142 A1 | 3/2010 | Lean et al. |
| 2010/0096335 A1 | 4/2010 | Sauvignet et al. |
| 2010/0101309 A1 | 4/2010 | Klyamkin et al. |
| 2010/0102006 A1 | 4/2010 | Quevillon |
| 2010/0155327 A1 | 6/2010 | Woodard et al. |
| 2010/0213123 A1 | 8/2010 | Marston et al. |
| 2010/0219372 A1 | 9/2010 | Hook et al. |
| 2010/0251571 A1 | 10/2010 | Woodard |
| 2010/0274209 A1 | 10/2010 | Roe et al. |
| 2011/0036771 A1 | 2/2011 | Woodard |
| 2011/0147304 A1 | 6/2011 | Sauvignet et al. |
| 2012/0067824 A1 | 3/2012 | Berg et al. |

FOREIGN PATENT DOCUMENTS

| | | | |
|---|---|---|---|
| CN | 101309870 A | | 11/2008 |
| DE | 19600647 A1 | | 7/1997 |
| EP | 12594 A1 | | 6/1980 |
| EP | 87223 A1 | | 8/1983 |
| EP | 139572 A1 | | 5/1985 |
| EP | 266098 A2 | | 5/1988 |
| EP | 392321 A1 | | 10/1990 |
| EP | 392322 A1 | | 10/1990 |
| EP | 1244601 B1 | | 10/2002 |
| EP | 1785400 A1 | | 5/2007 |
| EP | 2165980 A1 | | 3/2010 |
| FR | 1411792 A | | 9/1965 |
| FR | 2378550 A1 | | 8/1978 |
| FR | 2719235 A1 | | 11/1995 |
| JP | 07-299495 A | | 11/1995 |
| JP | 08-257583 A | | 10/1996 |
| JP | 11-169866 A | | 6/1999 |
| JP | 2000-233198 A | | 8/2000 |
| JP | 2001-170404 A | | 6/2001 |
| JP | 2003-010874 A | | 1/2003 |
| SU | 1136839 A1 | | 1/1985 |
| WO | 9312041 A1 | | 6/1993 |
| WO | 9735654 A1 | | 10/1997 |
| WO | 9735655 A1 | | 10/1997 |
| WO | 9803433 A1 | | 1/1998 |
| WO | 9919261 A1 | | 4/1999 |
| WO | 9931016 A1 | | 6/1999 |
| WO | 0114260 A1 | | 3/2001 |
| WO | 0128931 A1 | | 4/2001 |
| WO | 0140121 A1 | | 6/2001 |
| WO | 0200556 A1 | | 1/2002 |
| WO | 0242223 A1 | | 5/2002 |
| WO | 2005077835 A1 | | 8/2005 |
| WO | 2005087381 A1 | | 9/2005 |
| WO | 2006086384 A2 | | 8/2006 |
| WO | 2006102362 A2 | | 9/2006 |
| WO | 2007059141 A2 | | 5/2007 |
| WO | 2007098298 A2 | | 8/2007 |
| WO | 2008022192 A2 | | 2/2008 |
| WO | 2008039711 A2 | | 4/2008 |
| WO | 2008039936 A2 | | 4/2008 |
| WO | 2008085196 A2 | | 7/2008 |
| WO | 2008085197 A1 | | 7/2008 |
| WO | 2008086009 A1 | | 7/2008 |
| WO | 2008086010 A1 | | 7/2008 |
| WO | 2009083346 A1 | | 7/2009 |
| WO | 2010027895 A2 | | 3/2010 |
| WO | 2010081903 A1 | | 7/2010 |
| WO | 2010086249 A1 | | 8/2010 |

OTHER PUBLICATIONS

Catlow et al. "Ballasted Biological Treatment Process Removes Nutrients and Doubles Plant Capacity". WEFTEC Conference (Oct. 2008).

http://www.envirosim.com/includes/weftec08.htm, downloaded Dec. 16, 2012.

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, pp. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

Tozer, "Study of Five Phosphorus Removal Processes," The Georgia Operator, vol. 45, No. (Winter 2008).

www.ingentaconnect.com/content/wef/wefproc/2009/00002009/00000004/art0020, downloaded Dec. 16, 2012.

* cited by examiner

US 8,673,142 B2

SYSTEM FOR ENHANCING A WASTEWATER TREATMENT PROCESS

CROSS-REFERENCE TO RELATED APPLICATIONS

This application is a continuation of application Ser. No. 13/461,641 filed May 1, 2012, now U.S. Pat. No. 8,506,800, which is a continuation of application Ser. No. 12/584,545 filed on Sep. 8, 2009, now U.S. Pat. No. 8,470,172, which is a continuation-in-part of Ser. No. 12/008,216, filed Jan. 9, 2008, which is now U.S. Pat. No. 7,695,623, which claims priority to Provisional Application Nos. 60/994,553, filed Sep. 20, 2007 and 60/879,373, filed Jan. 9, 2007, each of which are incorporated by reference in their entirety for all purposes.

FIELD OF THE INVENTION

This invention relates to a system and method for enhancing a wastewater treatment process.

BACKGROUND OF THE INVENTION

Municipal and industrial wastewater treatment facilities often include primary, secondary and tertiary processes to treat wastewater to remove contaminants, such as suspended solids, biodegradable organics, phosphorus, nitrogen, microbiological contaminants, and the like, to provide a clean effluent. The clean effluent is typically subject to strict local, state and federal regulations.

The primary treatment processes often includes screens, grit chambers and/or primary clarifiers to remove large solids and other suspended matter to provide a primary effluent. Activated sludge is one type of secondary process which utilizes a biological reactor(s) which contains a large population of microorganisms that ingest contaminants in the primary effluent to form biological "flocs." Oxygen is typically fed into the biological reactor(s) to promote growth of these biological flocs. The combination of primary effluent, or in some cases raw sewage, and biological flocs, is commonly known as mixed liquor. The population or concentration of microorganisms in the mixed liquor is often referred to as mixed liquor suspended solids (MLSS).

After sufficient treatment in the biological reactor, the biological flocs in the mixed liquor are then typically sent to a secondary clarifier where the biological flocs are separated by gravity from the mixed liquor to provide a secondary effluent and a settled sludge. The secondary effluent, or "clean" effluent, may be discharged back to the environment or processed by additional tertiary treatment processes. The majority of the settled sludge in the secondary clarifier is typically recycled back to the biological reactor by a return activated sludge subsystem. The remaining, excess sludge is wasted from the system to control the concentration of mixed liquor suspended solids.

However, separation of the biological flocs from the mixed liquor in the secondary clarifier is difficult because the biological flocs are only marginally heavier than water, and therefore settle slowly. As a result, the secondary clarifier of a typical activated sludge process is often the bottleneck in most wastewater treatment processes that utilize activated sludge as a secondary process. The crucial solids separation step of the biological flocs from the mixed liquor in the secondary clarifier is therefore typically the rate limiting process which is governed by a variety of factors, most notably the specific gravity, or density, of the biological flocs.

Moreover, solids separation in the secondary clarifier in a typical activated sludge processes may be unreliable due to the many types of settling problems that are caused by inter alia: overgrowth of filamentous organisms, viscous bulking caused by the overgrowth of either zoogleal organisms or exocellular polysaccharide material, pin floc, straggler floc, excessive solids loading on the secondary clarifiers, excessive secondary clarifier surface overflow rate, and the like.

Sequencing batch reactor (SBR) systems may also be used to treat wastewater. A typical conventional SBR system includes one or more sequencing batch reactors which contains a large population of microorganisms that ingest contaminants in the influent wastewater to form biological flocs and treat the wastewater. However, during the settling phase of a typical conventional SBR system, the biological flocs settle slowly because they are only marginally heavier than water. The solids separation in the settling phase is also unreliable due to the many types of settling problems discussed above. This can result in reduced treatment capacity and/or compromised effective quality.

Another method of treating wastewater, such as wastewater from breweries, pharmaceutical plants, food processing plants, pulp and paper facilities, ethanol production facilities, and the like, is to use an anaerobic treatment reactor. The anaerobic treatment reactor creates an anaerobic environment which contains a population of microorganisms that ingest contaminants in the influent wastewater to form biological flocs and treat the wastewater. The wastewater is typically fed near the bottom of the anaerobic treatment reactor and into a sludge blanket where the microorganisms consume the waste therein. In operation, wastewater fed into the bottom of the anaerobic treatment reactor flows upward through the anaerobic sludge blanket to treat the wastewater.

However, if the flow rate of influent wastewater is too fast, the anaerobic sludge blanket can expand and become diffuse. The result may be an excess loss of microorganisms in the treated effluent which may compromise the quality of the treated effluent.

SUMMARY OF THE INVENTION

This invention features a system for enhancing an activated sludge process including at least one biological reactor. A weighting agent impregnation subsystem is coupled to the biological reactor for mixing biological flocs and weighting agent to impregnate the weighting agent into the biological flocs to form weighted biological flocs. A weighting agent recovery subsystem is configured to recover the weighting agent from the weighted biological flocs and reintroduce the recovered weighting agent to the weighting agent impregnation subsystem.

In one embodiment, the weighting agent recovery subsystem may include a separator subsystem for separating the weighting agent from the weighted biological flocs. The separator subsystem may include a shear mill. The separator subsystem may include a centrifugal separator. The separator subsystem may include an ultrasonic separator. The separator subsystem may include a shear mill and a wet drum magnetic separator. The separator subsystem may include a shear mill and a centrifugal separator. The separator subsystem may include an ultrasonic separator and a wet drum magnetic separator. The separator subsystem may include an ultrasonic separator and a centrifugal separator. The shear mill may include rotor and a stator, wherein the rotor and/or the stator include slots sized as to optimize separation of weighting agent from the weighted biological flocs. The weighting agent impregnation subsystem may include a weighting agent storage tank and at least one line. The weighting agent impregnation subsystem may include a weighting agent feeder subsystem configured to control the delivery rate of the weighting agent from the weighting agent storage tank to the weighting agent impregnation tank. The weighting agent feeder subsystem may include a pneumatic feeder subsystem. The pneumatic feeder subsystem may include porous media disposed on selected areas of the inside of the weighting agent storage tank and the inside of the at least one line. The pneumatic feeder subsystem may be configured to deliver a controlled supply of compressed air to the porous media to regulate fluidization and delivery of the weighting agent to the weighting agent impregnation tank. The weighting agent impregnation subsystem may include an impregnation tank and at least one mixer. The weighting agent impregnation subsystem may include a venturi mixer/eductor. The majority of the weighting agent may have a particle size less than about 100 µm. The majority of the weighting agent may have a particle size less than about 40 µm. The majority of the weighting agent may have a particle size less than about 20 µm. The weighting agent may include magnetite. The biological reactor may include at least one aeration tank and/or one or more sequencing batch reactors for receiving a flow of wastewater and for introducing dissolved oxygen to a population of microorganisms to promote growth of biological flocs in a mixed liquor defined by a concentration of mixed liquor suspended solids. The at least one biological reactor may be configured as at least one anaerobic treatment reactor. The system may include a flocculant injection subsystem configured to introduce a flocculant to the mixed liquor to enhance settling and thickening of weighted biological flocs and to provide agglomeration of non-impregnated biological flocs and/or partially impregnated biological flocs with weighted biological flocs. The system may include at least one clarifier configured to collecting the weighted biological flocs from the mixed liquor and configured to provide a secondary effluent and a settled sludge. The system may include a return activated sludge subsystem configured to recycle the majority of settled sludge to the biological reactor and/or to the weighting impregnation subsystem. The system may further include a wasting subsystem configured to waste remaining settled sludge of the weighting agent recovery subsystem to control the population of the microorganisms in the mixed liquor. The capacity of the system may be increased by increasing the concentration of mixed liquor suspended solids in the biological reactor by reducing the amount of the settled sludge wasted by the wasting subsystem. The amount of settled sludge wasted by the wasting subsystem may be reduced to increase the concentration of mixed liquor suspended solids for enhancing nitrification of ammonia in the mixed liquor. The nitrification may be enhanced by increasing the amount of dissolved oxygen introduced into the biological reactor. The biological reactor may include at least one anoxic zone configured to remove nitrogen from the mixed liquor. The biological reactor may include at least one anaerobic zone configured to remove phosphorus from the settled sludge. The system may further include a coagulant addition subsystem for adding coagulant to remove phosphorus by precipitation and/or coagulation. The coagulant addition subsystem may add to coagulant to the weighting agent impregnation subsystem and/or the at least one biological reactor and/or the flocculant injection subsystem to remove phosphorus by precipitation and/or coagulation. The weighting agent to a mixed liquor may be greater than about 1.5 to 1. The system secondary effluent may have a total suspended solids concentration less than about 30 mg/L. The weighting agent impregnation subsystem may be located downstream from the biological reactor and before the secondary clarifier.

This invention also features a system for enhancing an activated sludge process including at least one biological reactor. A weighting agent impregnation subsystem coupled to the biological reactor for mixing biological flocs and weighting agent having particle size less than about 100 µm to impregnate the weighting agent into the biological flocs to form weighted biological flocs. A weighting agent recovery subsystem is configured to recover the weighting agent from the weighted biological flocs and reintroducing the recovered weighting agent to the weighting agent impregnation subsystem.

In one embodiment, the majority of the weighting agent may have a particle size less than about 40 µm. The majority of the weighting agent may have a particle size less than about 20 µm.

This invention also features a method for enhancing a wastewater treatment process, the method including: a) receiving influent wastewater in at least one biological reactor, b) forming biological flocs in the biological reactor, c) impregnating weighting agent into the biological flocs to form weighted biological flocs, and d) recovering weighting agent from the weighted biological flocs to reintroduce the weighting agent to step c).

In one embodiment, the method may include the step of separating the weighting agent from the weighted biological flocs. The method may include the step of collecting the weighting agent and recycling the weighting agent to step c). The method may include the step of providing weighting agent in which the majority of the weighting agent has a particle size less than about 100 µm. The method may include the step of providing weighting agent in which the majority of the weighting agent has a particle size less than about 40 µm. The method may include the step of providing weighting agent in which the majority of the weighting agent has a particle size less than about 20 µm. The method may include the step of introducing dissolved oxygen to a population of microorganisms to promote growth of biological flocs in a mixed liquor defined by a concentration of mixed liquor suspended solids. The method may further include the step of introducing a flocculant to the mixed liquor to enhance settling and thickening of the weighted biological flocs and to establish agglomeration of non-impregnated biological flocs and/or partially impregnated biological flocs with the weighted biological flocs.

The subject invention, however, in other embodiments, need not achieve all these objectives and the claims hereof should not be limited to structures or methods capable of achieving these objectives.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
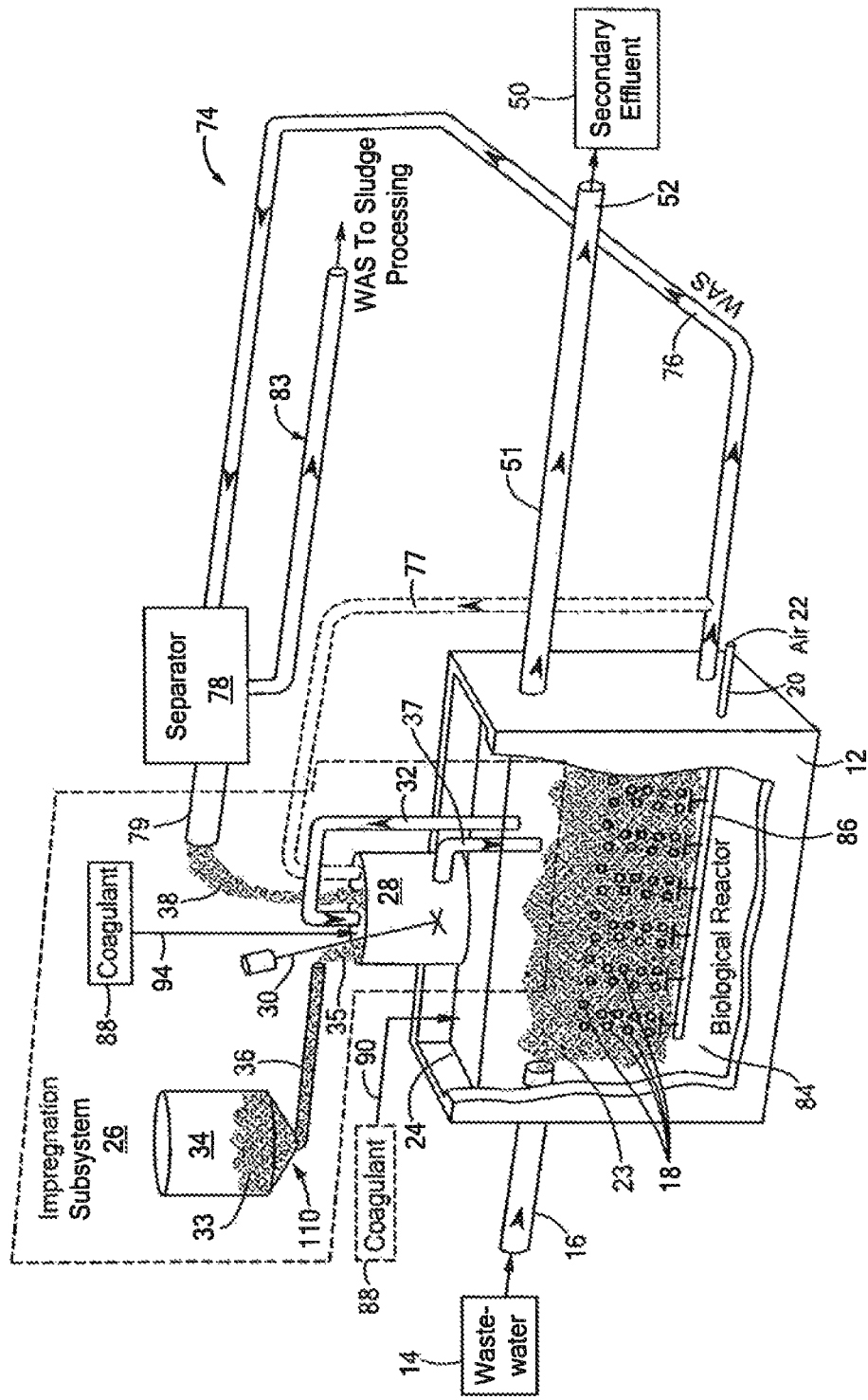
FIG. 1 is a three-dimensional view of one embodiment of the system for enhancing a wastewater treatment process of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of system 10 for enhancing a wastewater treatment process of this invention. System 10 may be used to enhance wastewater treatment processes, including, inter alia, activated sludge wastewater treatment processes, SBR processes, anaerobic treatment reactor processes, or any other similar type wastewater treatment processes. When used to enhance an activated sludge wastewater treatment process or an SBR process, system 10 includes at least one biological reactor 12, e.g., an aeration tank, which receives a flow of wastewater 14 by line 16. Biological reactor 12 preferably introduces dissolved oxygen 18 by line 20 exposed to ambient air 22 to a population of microorganisms to promote growth of biological flocs 23 in mixed liquor 24. Mixed liquor 24 is typically a combination of wastewater 14 and biological flocs 23 and may be defined by a concentration of mixed liquor suspended solids (MLSS). In other examples, system 10 may also be used to enhance an anaerobic treatment process. In this case, biological reactor 12 is configured as an anaerobic treatment reactor. To do this, no oxygen is introduced to reactor 12 and an anaerobic environment is created therein.

System 10 also includes weighting agent impregnation subsystem 26 which, in one embodiment, preferably includes weighting agent storage tank 34 coupled to line 36, weighting agent impregnation tank 28, and mixer 30. Weighting agent impregnation tank 28 receives mixed liquor 24 from biological reactor 12 by line 32 or settled sludge from the bottom of biological reactor 12 via line 77. Impregnation tank 28 preferably receives virgin weighting agent 33, e.g., from weighting agent storage tank 34 by line 36, as shown at 35, and/or recycled weighting agent 38 from weight agent recovery subsystem 74.

In one design, weighting agent impregnation subsystem 26 preferably includes weighting agent feeder subsystem 110 configured to control the delivery rate of virgin weighting agent 33 to weighting agent impregnation tank 28. Weighting agent feeder subsystem 110, FIG. 2, typically includes pneumatic feeder subsystem 112 which includes porous media 114, e.g., a plurality of stainless steel screens disposed on selected areas of the inside of weighting agent storage tank 34, e.g., areas 116 and 118 at the bottom of weighting agent storage tank 34. Porous media 114 is also preferably disposed on the inside of line 36. In one design, pneumatic feeder subsystem 110 is configured to regulate supply of compressed air 120 by lines 121 to the porous media 114 in tank 34 and in line 36 to regulate the delivery rate of weighting agent 33 delivered to weighting agent impregnation tank 28. In one example, porous media 114 may be a porous 316 stainless steel material with an ultra-smooth finished contact surface made for precise control of permeability and strength. Porous media 114 produces an evenly distributed layer of air 120 that fluidizes weighting agent 33 in areas 116 and 118 of storage tank 34 and in line 36 above porous media 114. The boundary layer above porous media 114 reduces buildup, friction, and wear. It also makes weighting agent 33 easier to convey by eliminating compaction and drag of weighting agent 33 in areas 116 and 118 of storage tank 34 and in line 36. One example of pneumatic feeder subsystem is available from Young Industries (Muncie, Pa.).

Figure 2:
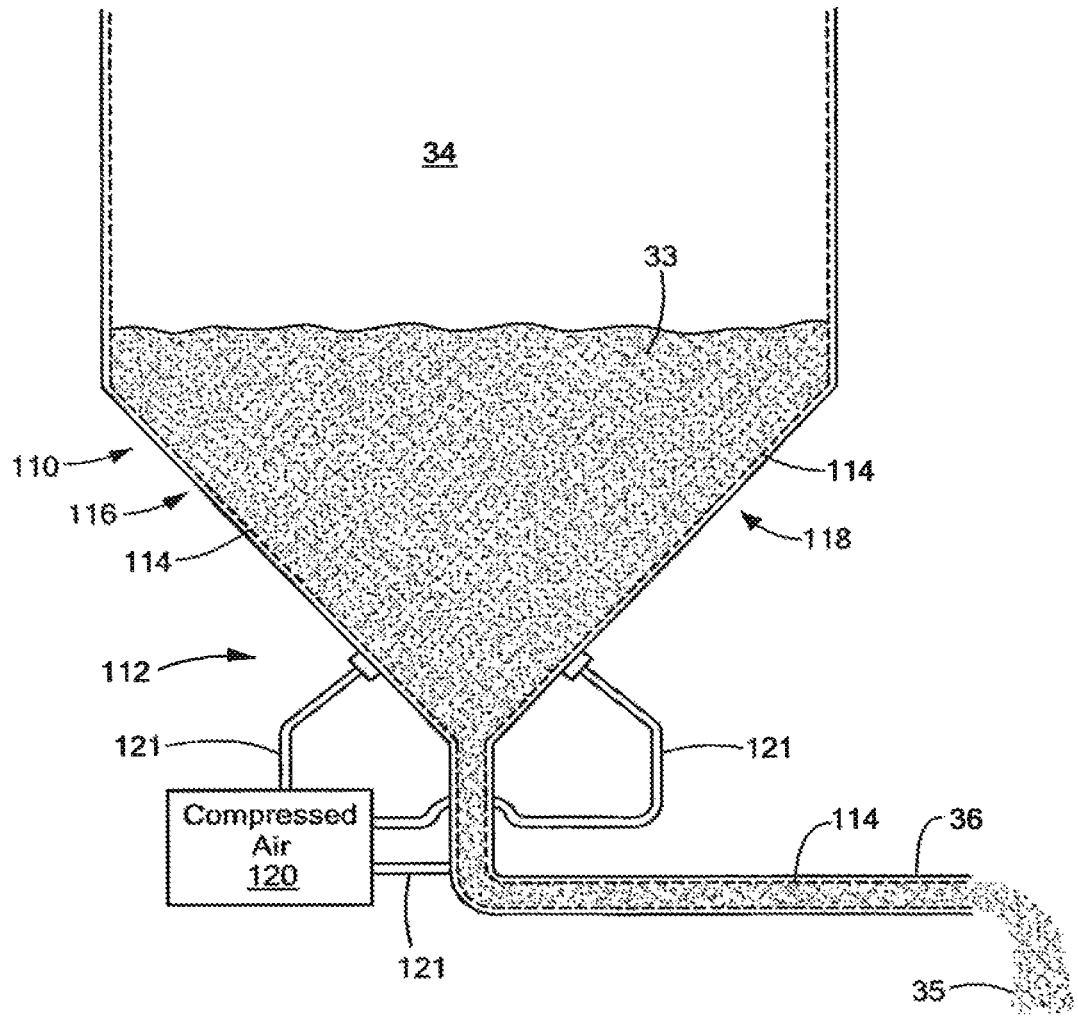
FIG. 2 is a schematic side view showing in further detail one embodiment of the weighting agent feeder subsystem shown in FIG. 1.

In operation, the delivery rate of weighting agent 33 to weighting agent impregnation tank 28, FIG. 1, is controlled by regulating the amount of air 120, FIG. 2, delivered by lines 121 to porous media 114. Higher rates of weighting agent 33 delivered to weighting agent impregnation tank 28 may be used for initially impregnating the entire population of biological flocs 23 in biological reactor 12 and a secondary clarifier (discussed below) with weighting agent. Thereafter, a maintenance dose of weighting agent 33 may be supplied to weighting agent impregnation tank 28 to maintain a desired concentration of weighting agent.

Mixer 30 mixes the mixed liquor or the settled sludge in tank 28 with virgin weighting agent 33 and/or the recycled weighting agent 38 to impregnate the weighting agent into the biological flocs in mixed liquor or the settled sludge to form weighted biological flocs. Mixer 30 preferably utilizes a mixing energy sufficient to impregnate the weighting agent into biological flocs suspended in a mixed liquor or the settled sludge to form weighted biological flocs. The weighted biological flocs in tank 28 are then sent back to biological reactor 12 by line 37. The treated secondary effluent 50 exits reactor 12 by line 51.

Figure 3:
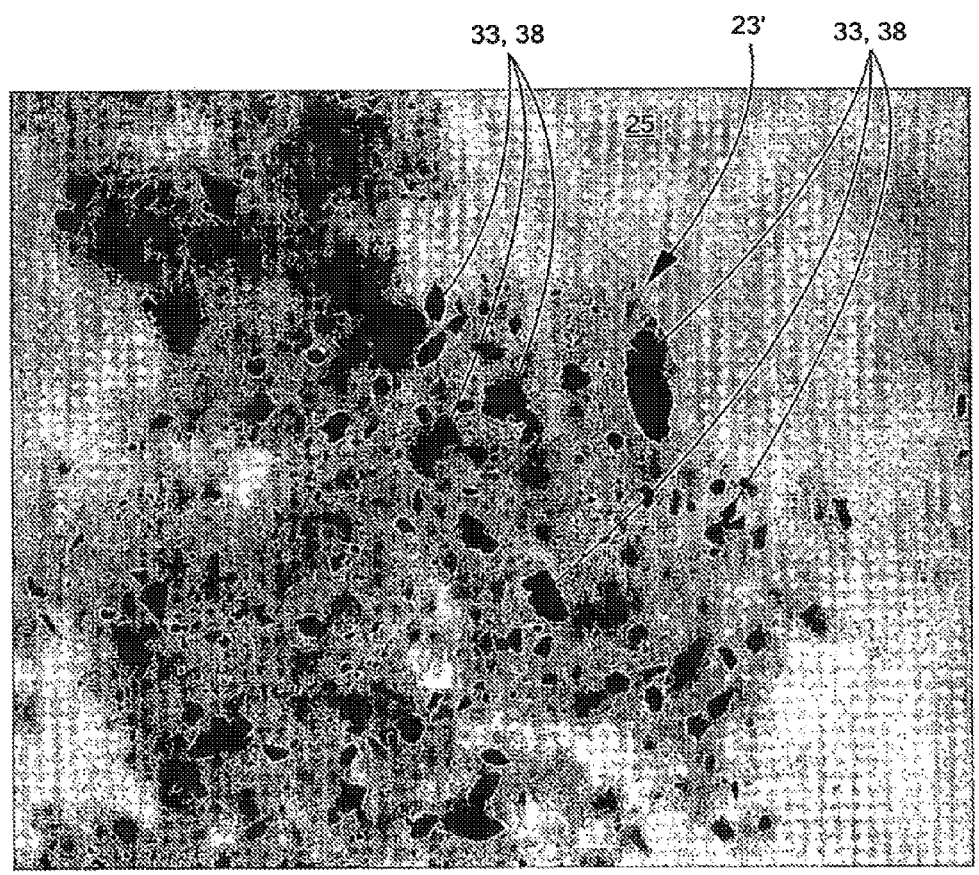
FIG. 3 is a microscopic photograph showing one example of weighting agent impregnated into a biological flocs to form a weighted biological flocs in accordance with this invention.

FIG. 3 shows a microscopic view of one example of biological flocs 23 impregnated with virgin weighting agent 33 and recycled weighting agent 38 to form weighted biological floc 25.

Because weighted biological flocs generated by weighting agent impregnation subsystem 26 have a greater specific gravity than non-impregnated biological flocs, they settle faster than non-impregnated biological flocs. Thus, the time needed to separate weighted biological flocs from the mixed liquor of system 10 is reduced when compared to a conventional activated sludge wastewater treatment system or SBR system. The weighted sludge blanket of an anaerobic treatment system is also more compact and dense and therefore can handle higher flow rates and is not as diffuse. The result is system 10 can substantially increase the capacity of such wastewater systems while providing a high quality treated effluent.

In another embodiment, weighting agent impregnation subsystem 26', FIG. 4, where like parts have been given like numbers, may be configured as venturi mixer/eductor 27 having nozzle 31 and funnel 45 which receives virgin weighting agent 33, e.g., from tank 34 by line 36, and/or recycled weighting agent 38 from separator 78. Weighting agent impregnation subsystem 26' may also include pneumatic feeder subsystem 110, similar as discussed above with reference to FIG. 2 for controlling the delivery rate of weighting agent 33 to funnel 45, FIG. 4. Venturi mixer/eductor 27 preferably receives mixed liquor by line 32 or settled sludge by line 77, as shown in FIG. 1.

In operation, the velocity of mixed liquor in line 32 or the settled sludge in line 77 is increased through nozzle 31. Virgin weighting agent 33 and/or recycled weighting agent 38 in funnel 45 enters nozzle 31 by line 39 and travels downstream to line 37. The widening of line 37 at 41 induces intimate mixing and entrainment, as shown at 43. This impregnates the virgin and/or recycled weighting agent into the biological flocs to form weighted biological flocs. The weighted biological flocs are then returned to biological reactor 12 by line 37, as shown in FIG. In one example, the weighting agent may be magnetite, or any similar type weighting agent or magnetically separable inorganic material known to those skilled in the art which increases the density of the biological flocs when impregnated therein. In one example, the majority of the weighting agent has a particle size less than about 100 μm. In other examples, the majority of the weighting agent particles have a size less than about 40 μm or less than about 20 μm.

System 10, FIG. 1, also includes weighting agent recovery subsystem 74 which receives settled sludge from biological reactor 12 by line 76. Weighting agent recovery subsystem 74 preferably includes separator subsystem 78 which recovers the weighting agent from the weighted biological flocs in the settled sludge in line 76 and reintroduces (recycles) weighting agent 38 to weighting agent impregnation subsystem 26, 26', FIGS. 1 and 4.

In one design, separator subsystem 78 may be configured as shear mill 112, FIG. 5A, which shears the sludge in line 76 to separate the weighting agent from the weighted biological flocs. Shear mill 112 ideally includes rotor 80 and stator 82. In operation, the settled sludge in line 76 enters shear mill 112 and flows in the direction of arrows 180 and enters rotor 80 and then stator 82. Shear mill 112 is designed such that there is a close tolerance between rotor 80, FIG. 5B and stator 82, as shown at 83. Rotor 80 is preferably driven at high speeds, e.g., greater than about 1,000 r.p.m. to form a mixture of weighting agent and obliterated flocs in area 182, FIG. 5A, of shear mill 112. The mixture of weighting agent and obliterated flocs exits shear mill 112 by line 79, as shown by arrows 184. FIG. 5C shows in further detail the structure of one embodiment of shear mill 112. Preferably, rotor 80, FIGS. 5A-5C, and/or stator 82 includes slots which function as a centrifugal pump to draw the settled sludge from above and below rotor 80 and stator 82, as shown by paths 182, 183, FIG. 5A, and then hurl the materials off the slot tips at a very high speed to break the weighted biological flocs into the mixture of weighting agent and obliterated flocs. For example, rotor 80, FIG. 5B, may include slots 186 and stator 82 may include slots 188. Slots 186 in rotor 80 and/or slots 188 in stator 82 are preferably optimized to increase shear energy to efficiently separate the weighting agent from the weighted biological flocs. The shear developed by rotor 80 and stator 82 depends on the width of slots 186 and 188, the tolerance between rotor 80 and stator 82, and the rotor tip speed. In one example, rotor 80 is driven at about 9,000 ft/min. The result is shear mill 112 provides a shearing effect which effectively and efficiently separates the weighting agent from the weighted biological flocs to facilitate recovery of the weighting agent.

In another design, separator subsystem 78, FIG. 6, where like parts have been given like numbers, may be configured as ultrasonic separator 116. Ultrasonic separator 116 typically includes one or more ultrasonic transducers, e.g., ultrasonic transducer 262, 264, 266, 268, and/or 270, available from Hielscher Ultrasonics GmbH, Stuttgart, Germany, which generates fluctuations of pressure and cavitation in the settled sludge in line 76. This results in microturbulences that produce a shearing effect to create a mixture of weighting agent and obliterated flocs to effectively separate the weighting agent from the weighted biological flocs in the settled sludge. The resulting mixture of weighting agent and obliterated flocs exits ultrasonic separator 116 by line 79.

In yet another design, separator subsystem 78, FIG. 7, where like parts have been given like numbers, may be configured as centrifugal separator 118. Centrifugal separator 114 typically includes cylindrical section 302 located at the top of hydrocyclone 300 and conical base 304 located below section 302. The settled sludge in line 76 is fed tangentially into cylindrical section 302 via port 303. Smaller exit port 306 (underflow or reject port) is located at the bottom of conical section 304 and larger exit port 308 (overflow or accept port) is located at the top of cylindrical section 302.

In operation, the centrifugal force created by the tangential feed of the sludge by port 303 causes the denser weighting agent to be separated from the weighted biological flocs in the settled sludge. The separated weighting agent is expelled against wall 308 of conical section 304 and exits at port 306. This effectively separates the weighting agent from the weighted biological flocs. The recovered weighting agent 38 exits via port 306 and may be deposited to weighting agent impregnation system 26, 26', FIGS. 1 and 4. The less dense biological flocs remain in the sludge and exit via port 308 through tube 310 extending slightly into the body of the center of centrifugal separator 118.

Although as discussed above, separator subsystem 78 may be configured as a shear mill, an ultrasonic separator, or a centrifugal separator, this is not a necessary limitation of this invention.

In other designs, separator subsystem 78 may be configured as a tubular bowl, a chamber bowl, an imperforate basket, a disk stack separator, and the like, as known by those skilled in the art.

In the example above where a separator 78, FIGS. 5A-5C, is configured as shear mill 112 to create the mixture of weighting agent and obliterated biological flocs, wet drum magnetic separator 81, FIG. 8, or centrifugal separator 118, FIG. 7, may be used to recover the weighting agent therefrom. Further details of the design and operation of wet drum magnetic separator 81 are disclosed in co-pending application U.S. Publication No. 2008/0164184, entitled "Fluidic Sealing System For a Wet Drum Magnetic Separator", and U.S. Publication No. 2008/016483, entitled "Collection System for a Rotating Wet Drum Magnetic Separator", both incorporated by reference herein.

Figure 6:
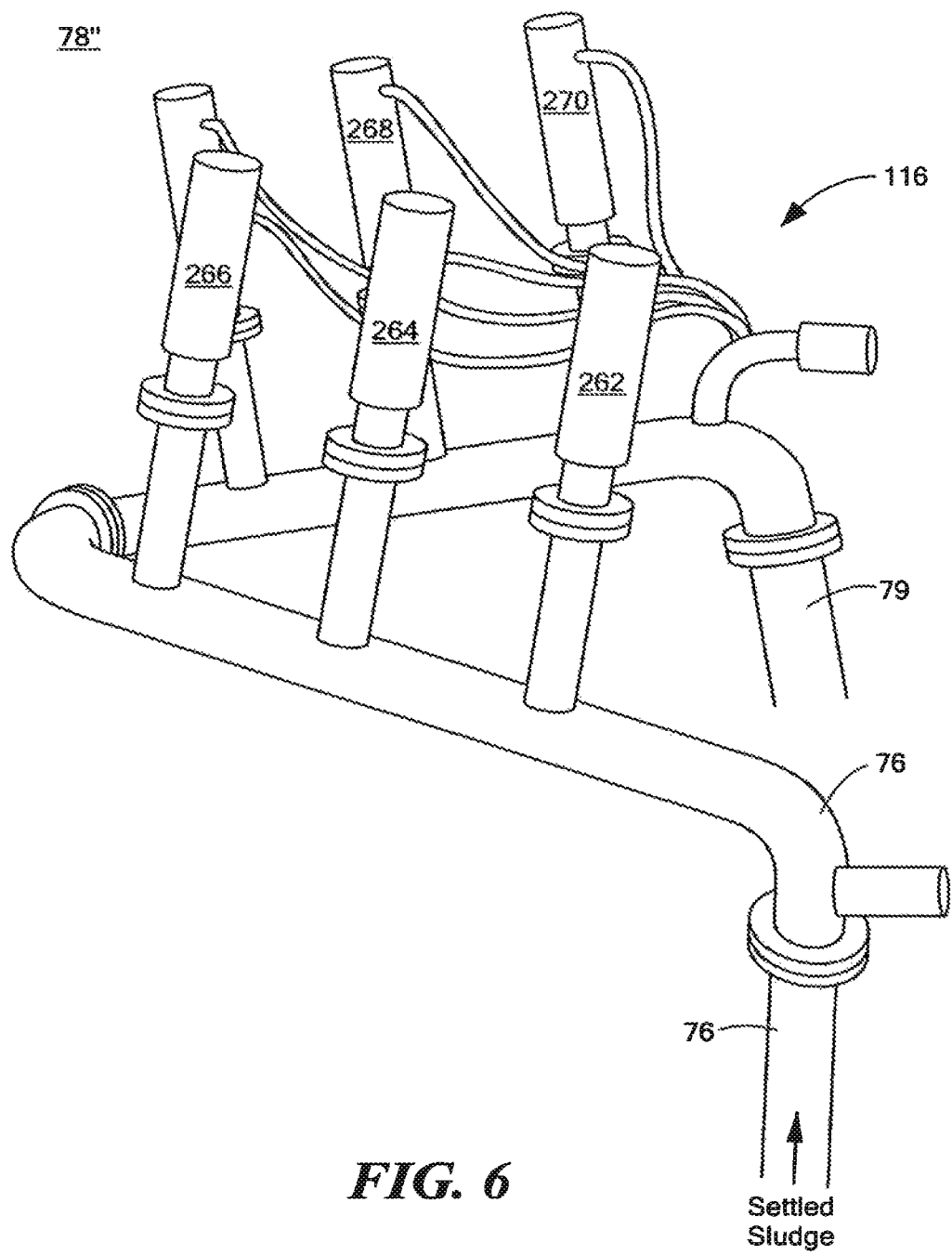
FIG. 6 is a three-dimensional front-view of another embodiment of the separator shown in FIG. 1.
Figure 7:
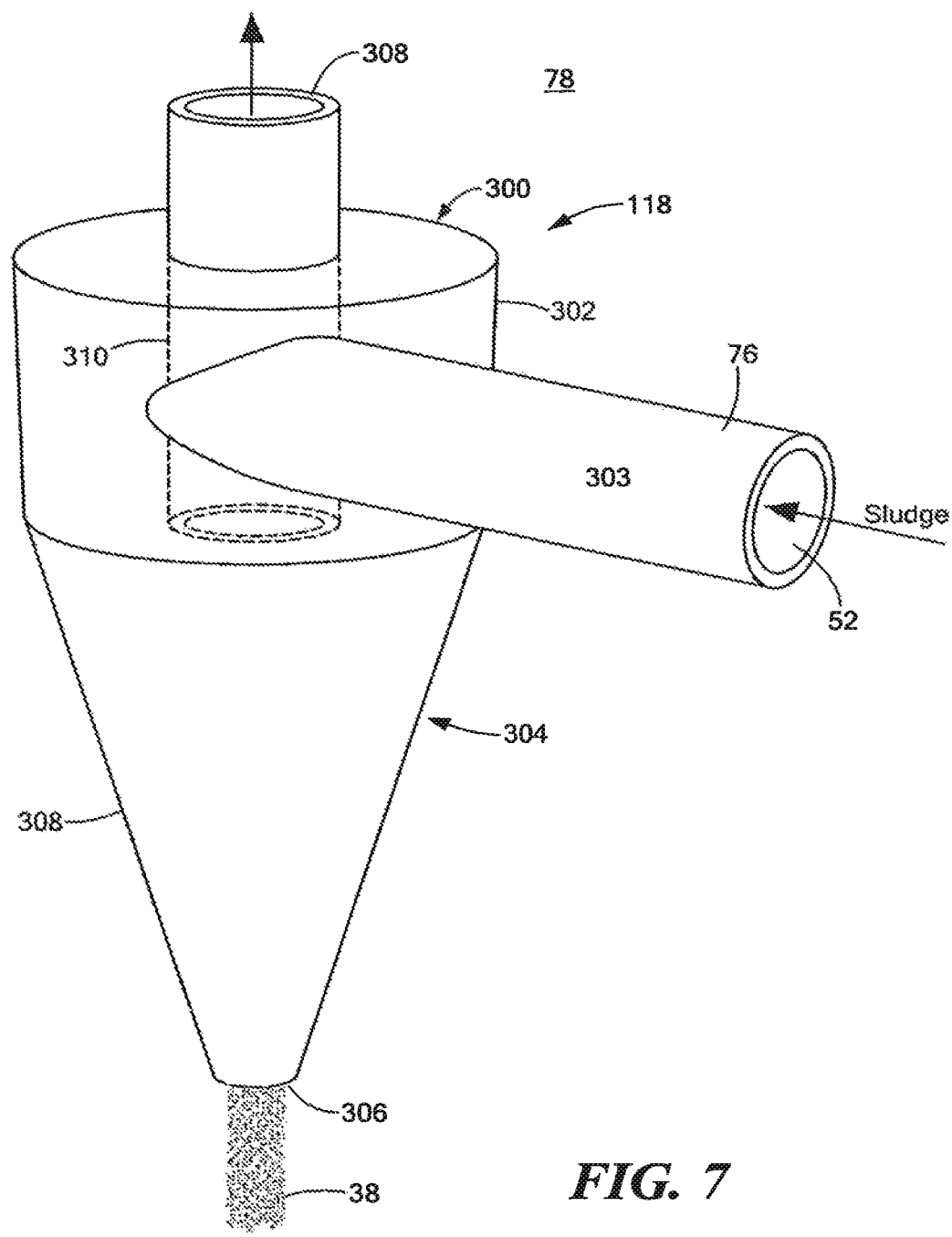
FIG. 7 is a three-dimensional front-view of yet another embodiment of the separator shown in FIG. 1.
Figure 8:
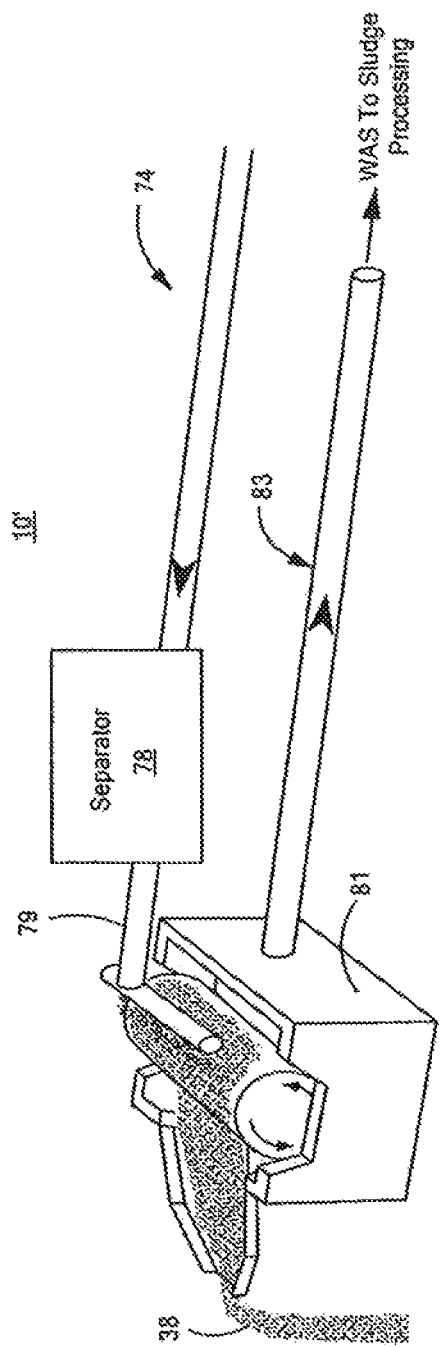
FIG. 8 is a three-dimensional front-view of one example of a wet drum magnetic separator which may be utilized by the weighting agent recovery subsystem shown in FIG. 1.

In the example where separator subsystem 78, FIG. 6, is configured as an ultrasonic separator 116 to create the mixture of weighting agent and obliterated biological flocs, wet drum magnetic separator 81, FIG. 8, or centrifugal separator 118, FIG. 7, may be used to recover the weighting agent therefrom.

The result of recovering and recycling the weighting agent as discussed above with reference to FIGS. 5A-7 significantly reduces the operating costs of wastewater treatment system 10.

System 10, FIG. 1 may also include wasting subsystem 83 which wastes the remaining settled sludge of separator subsystem 78 to control the population of the microorganisms in mixed liquor 24 in biological reactor 12.

Figure 4:
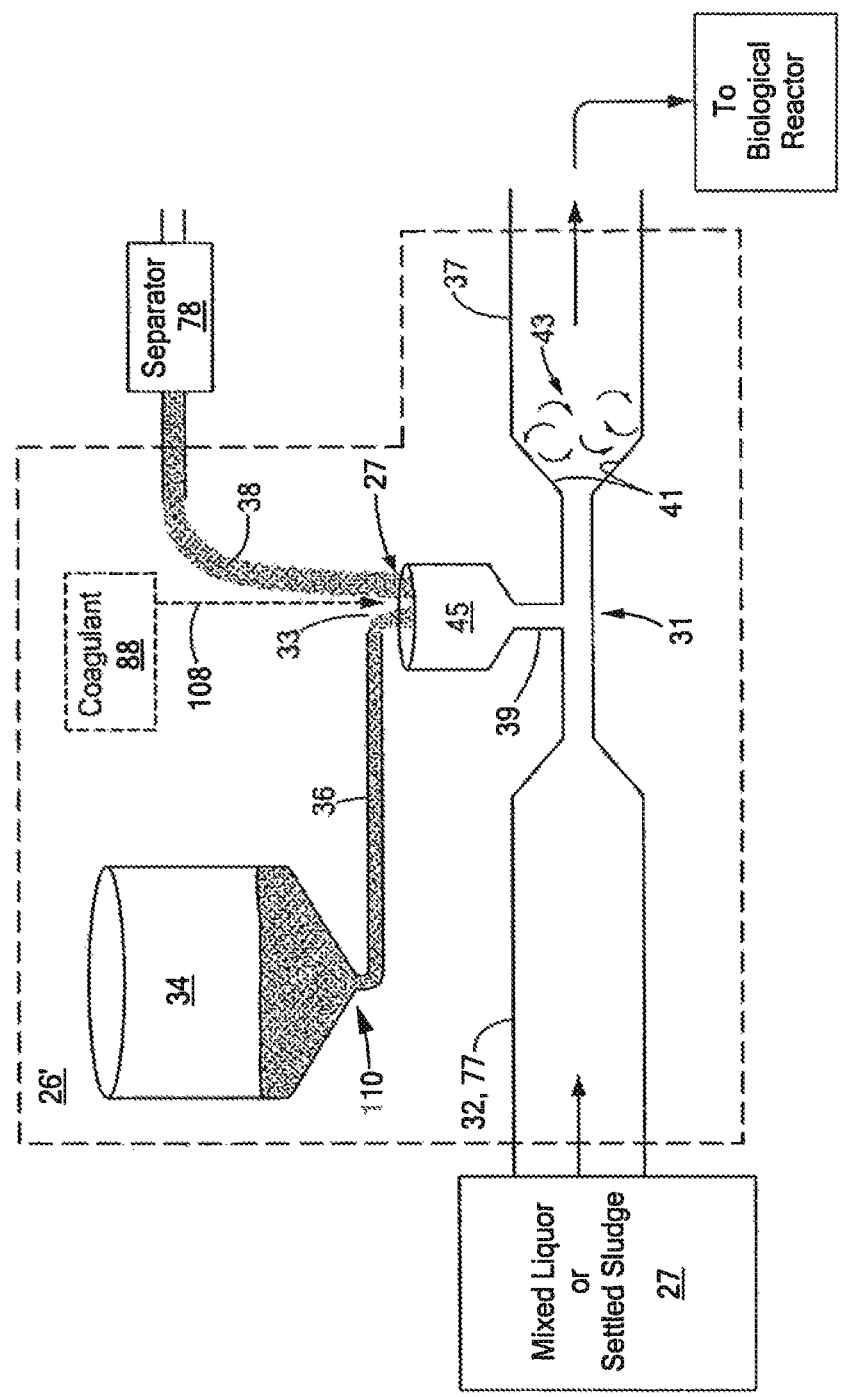
FIG. 4 is a schematic side-view showing another embodiment of the weighting agent impregnation subsystem shown in FIG. 1.
Figure 5A:
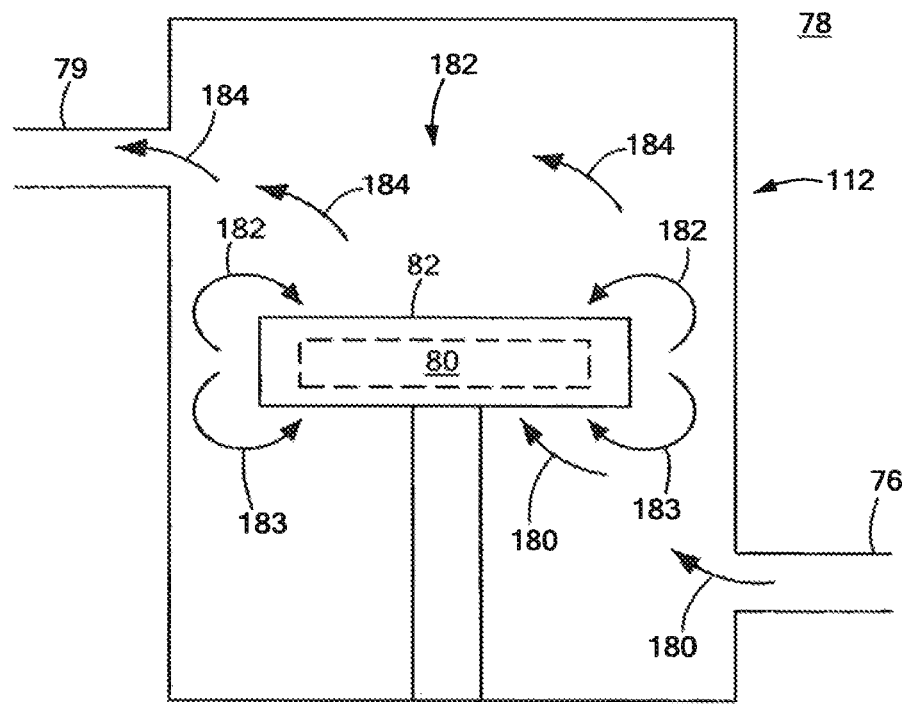
FIG. 5A is a schematic side-view of one embodiment of the separator shown in FIG. 1.
Figure 5B:
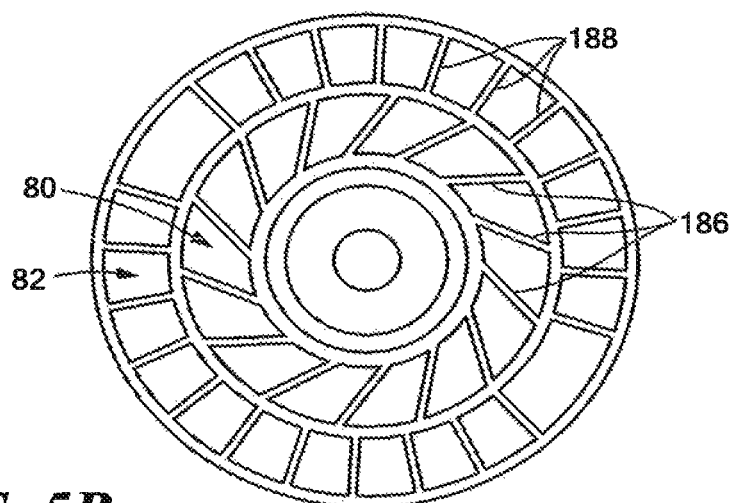
FIG. 5B is a schematic top view showing one example of slots in the rotor and stator of the shear mill shown in FIG. 5A.
Figure 5C:
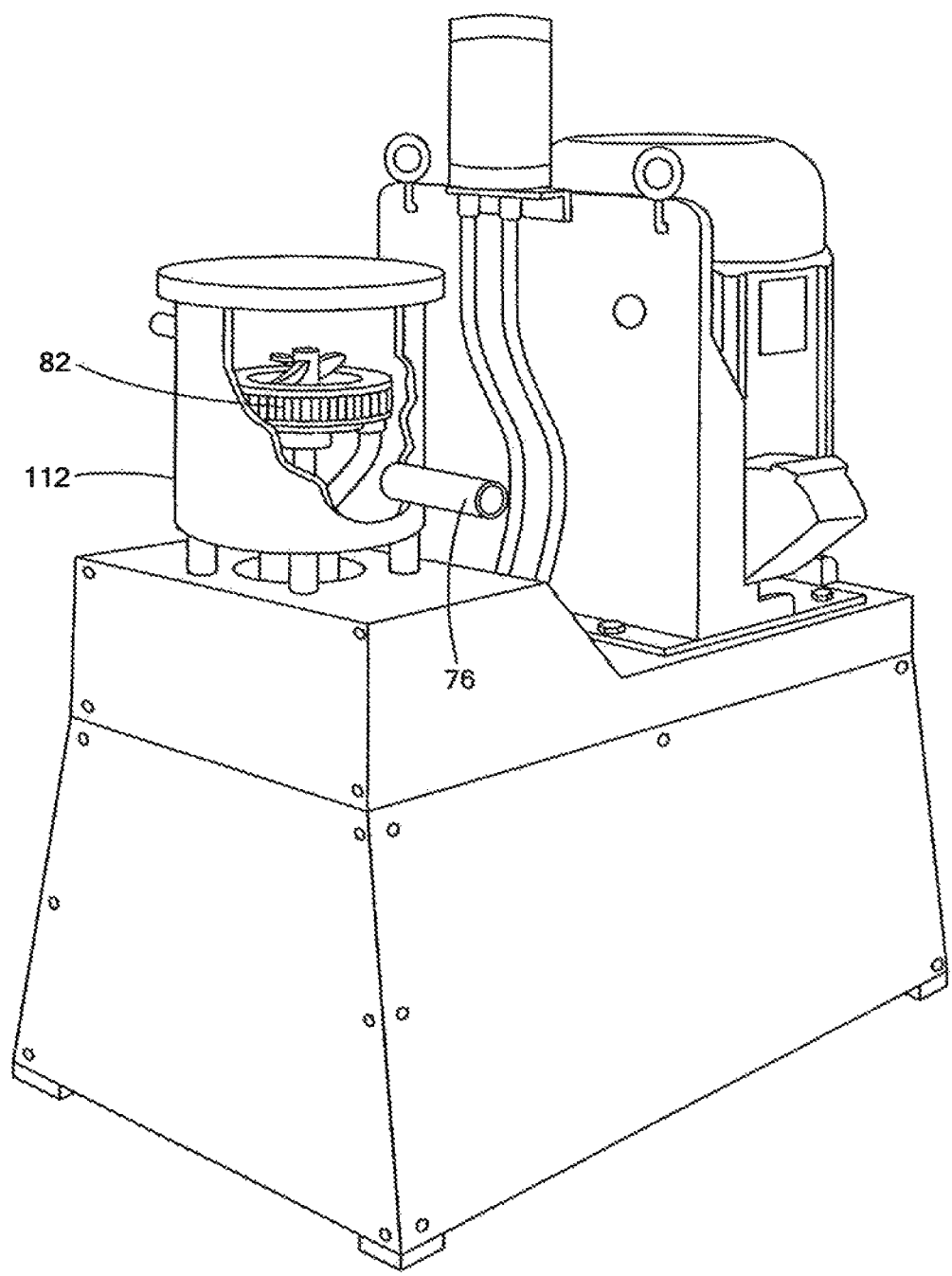
FIG. 5C is a three-dimensional view of one embodiment of the shear mill in FIG. 5A.
Figure 9:
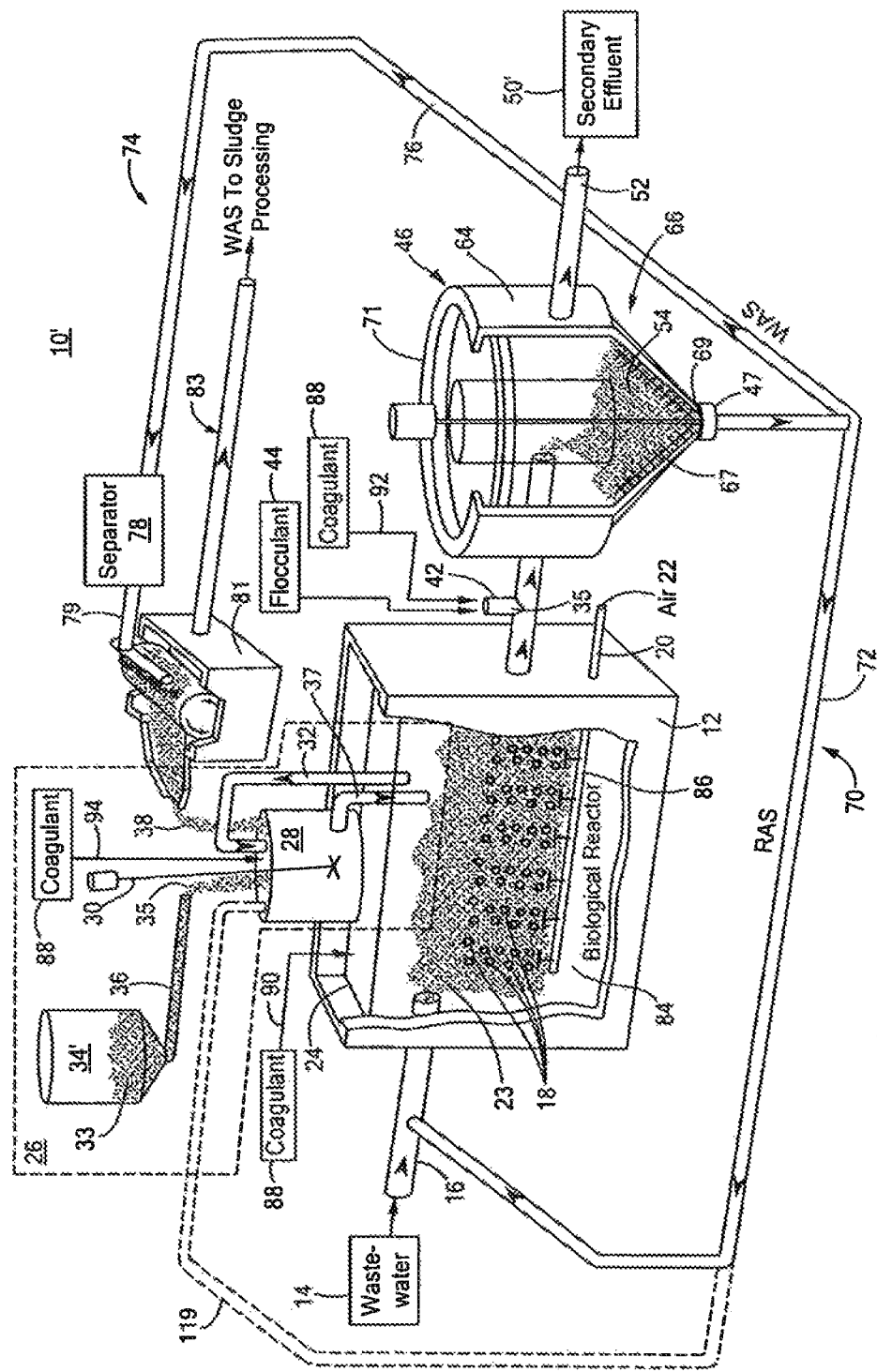
FIG. 9 is a three-dimensional view of another embodiment of the system for enhancing a wastewater treatment process of this invention.

In another embodiment, system 10', FIG. 9, where like parts have been given like numbers includes biological reactor 12, weighting impregnation subsystem 26 and/or weighting impregnation subsystem 26', FIG. 4, and weighting agent recovery subsystem 74 with separator subsystem 78, which function similar as discussed above with reference to FIGS. 1-8. In this example, system 10' also includes flocculant injection subsystem 42, typically located downstream from biological reactor 12, although flocculant injection subsystem 42 may be at any desired location in system 10. In this example, flocculant injection subsystem introduces flocculant 44 into mixed liquor 24 by line 135. Flocculant 44 enhances settling and thickening of the weighted biological flocs suspended in mixed liquor 24 in secondary clarifier 46 and establishes agglomeration of non-impregnated biological flocs and/or partially impregnated biological flocs with the weighted biological flocs in secondary clarifier 46. In one example, flocculant 44 may be cationic or anionic polymer, such as Drewfloc® 2270 (Ashland Chemical, New Jersey), or any similar type polymer known to those skilled in the art.

The agglomeration of non-impregnated biological flocs and/or partially impregnated flocs with the weighted biological flocs makes larger weighted biological flocs to provide for rapid settling of the weighted biological flocs in settling zone 64 of clarifier 46. Flocculant 44 also enhances settling and thickening of the weighted biological flocs in thickening zone 66 of clarifier 46 by reducing the size of, and increasing the density of, the weighted biological flocs. This creates "drainage" channels between the weighted biological flocs which allow water at bottom 69 of clarifier 46 to flow towards top 71 of clarifier 46 and weighted biological flocs to flow towards bottom 69 in thickening zone 66 of secondary clarifier 46 to enhance the thickening process.

System 10' also preferably includes secondary clarifier 46 which may be used to separate and collect the weighted biological flocs from the mixed liquor. In one example, a rake or siphon (draft tube) subsystem 67 is used to remove settled sludge 54 at bottom 69 of clarifier 46. Because the weighted biological flocs have a greater specific gravity than non-impregnated biological flocs, they settle faster in secondary clarifier 46 than non-impregnated biological flocs utilized in a typical system for an activated sludge process. Thus, secondary clarifier 46 effectively and efficiently separates the weighted biological flocs from the mixed liquor to provide secondary effluent 50'. As a result, the time needed to separate weighted biological flocs from mixed liquor 24 of the system 10' is reduced when compared to a typical activated sludge or similar type wastewater treatment process. This increases the capacity of system 10' to process wastewater 14. Therefore, system 10' is more effective, efficient, reliable, cost effective, and robust than a typical system for an activated sludge process. Moreover, the size of clarifier 46 and/or biological reactor 12 can be reduced, allowing system 10' to treat the same quantity of wastewater in a smaller footprint. This reduces the installation costs and land requirements of system 10'. Additionally, the problems associated with the separation process of the biological flocs from the mixed liquor in the secondary clarifier, as discussed in the Background Section, are alleviated.

System 10', FIG. 9, may also include return activated sludge subsystem 70 which recycles the majority of settled sludge 54 in secondary clarifier 42 to biological reactor 12 by line 72 using pump 47 and/or sends the settled sludge 54 to weighting impregnation subsystem 26, 26' via line 119.

The capacity of system 10', FIGS. 1-9, to process wastewater 14 may be increased by increasing the concentration of the MLSS in biological reactor 12 by reducing the amount of settled sludge wasted by wasting subsystem 83. The amount of settled sludge wasted by wasting subsystem 83 may also be reduced to increase the concentration of MLSS in aeration tank 12 to enhance nitrification of ammonia in mixed liquor 24. The nitrification process may also be further enhanced by increasing the amount of dissolved oxygen 18 introduced to biological reactor 12 by line 20.

Coagulant 88, FIGS. 1 and 9, may be added to biological reactor 12, as shown at 90 or to weighting agent impregnation tank 28, as shown at 94, for removing phosphorus and other contaminants from mixed liquor 24 by precipitation and/or coagulation, as known by those skilled in the art. In other examples, coagulant 88 may be added to flocculant injection port 42, FIG. 9, as shown at 92, to remove phosphorus by precipitation and/or coagulation. In yet another example, coagulant 88 may be added to weighting agent impregnation tank 28, FIGS. 1 and 9, as shown at 94, or to venture mixer/eductor 27, FIG. 4, as shown at 103, for removing phosphorus by precipitation and/or coagulation.

The ratio of the weighting agent, e.g., magnetite or similar type materials known to those skilled in the art, to mixed liquor and/or settled sludge may be greater than about 1.5 to 1.0. In one example, secondary effluent 50 has a suspended solid concentration of less than about 30 mg/L, which may meet local, state, and federal guidelines for secondary effluent 50.

Figure 10:
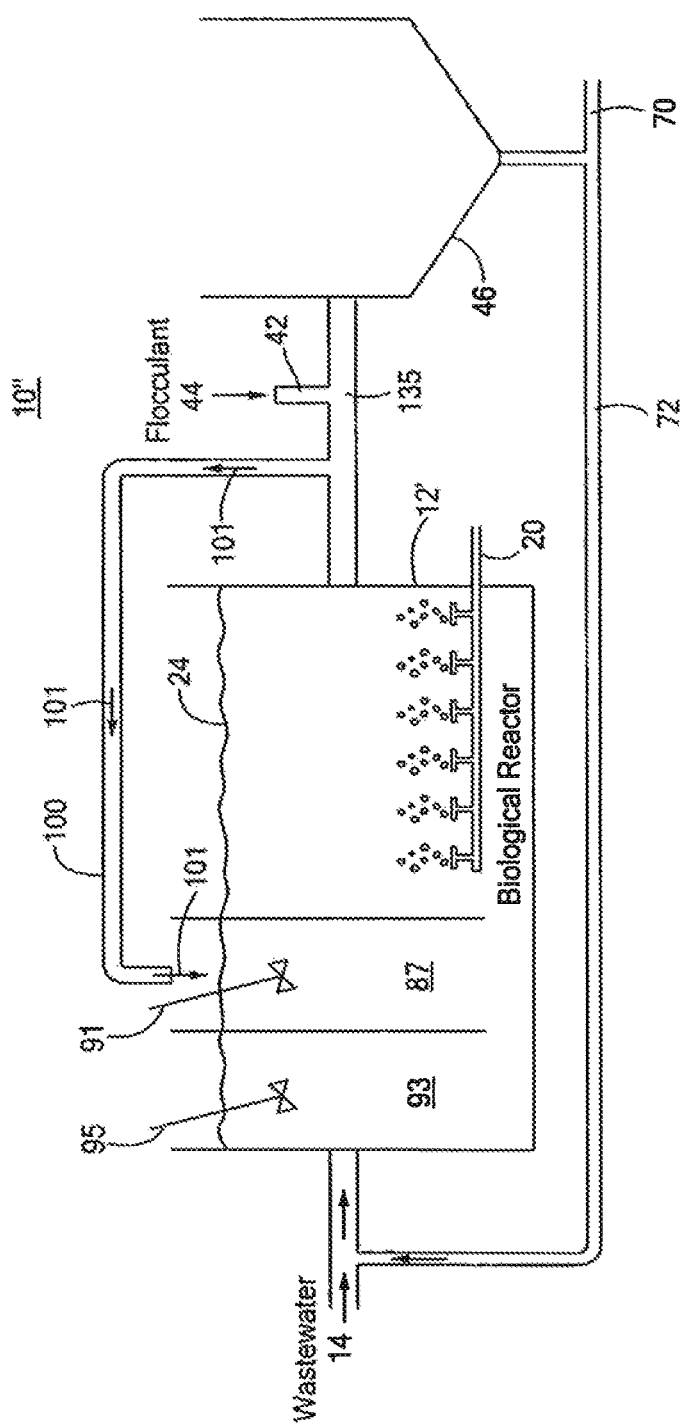
FIG. 10 is a schematic block diagram of one embodiment of the biological reactor shown in FIG. 9 including an anoxic zone configured to remove nitrogen and an anaerobic zone configured to remove phosphorus.

System 10", FIG. 10, where like parts have been given like numbers, may include biological reactor 12', e.g., an aeration tank, having anoxic zone 87 with mixer 91 configured to remove nitrogen from mixed liquor 24. In this example, recycle line 100 connected to line 135 recycles mixed liquor 24 to anoxic zone 87, as shown by arrows 101. Biological reactor 12' may also include anaerobic zone 93 with mixer 95 configured to remove phosphorus from the mixed liquor 24 In this example, line 72 of return activated sludge subsystem 70 recycles the settled sludge to anaerobic zone 84. Many other possible biological nutrient removal configurations may be utilized, as known to those skilled in the art.

Figure 11:
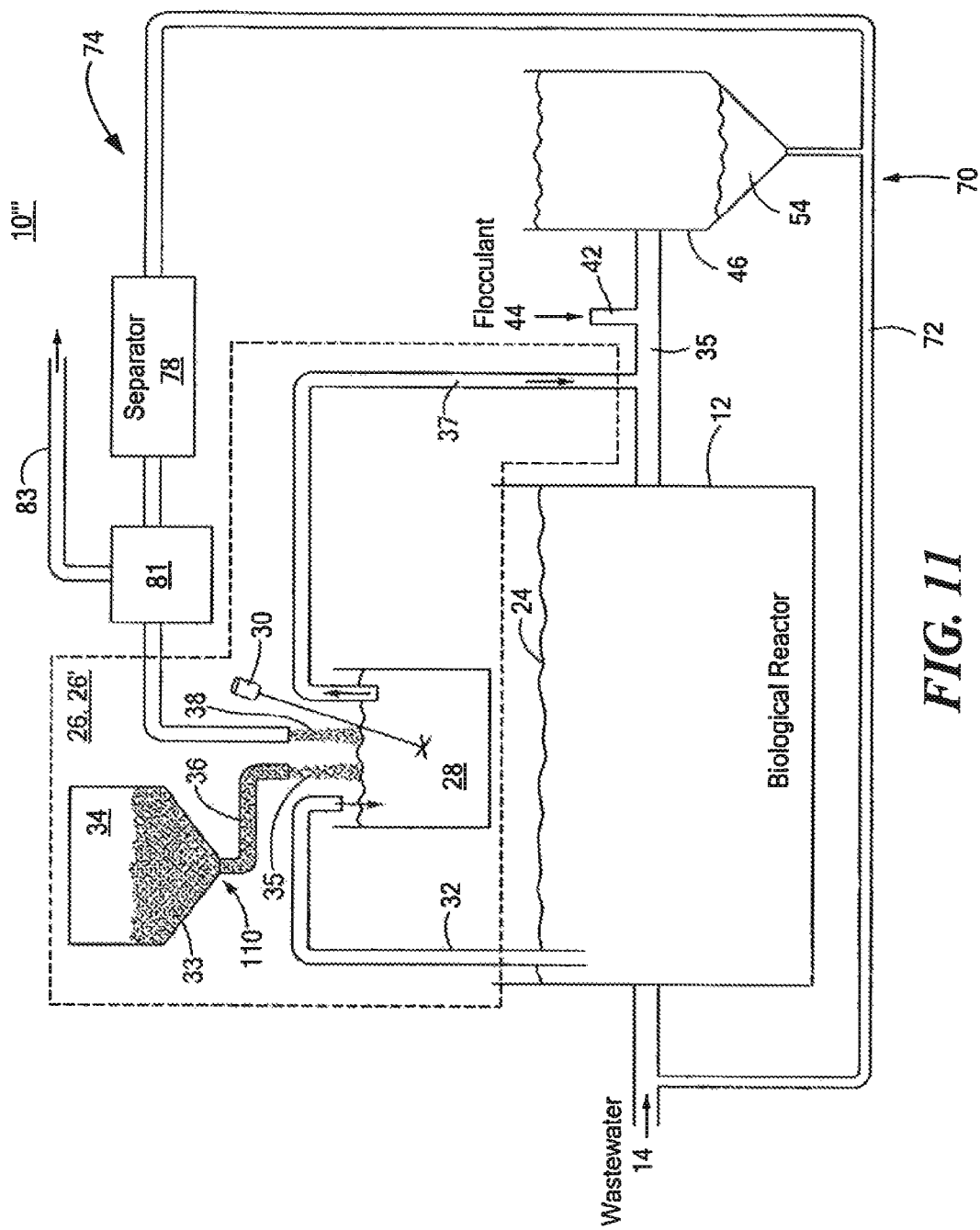
FIG. 11 is a schematic side-view of another embodiment of the system for enhancing a wastewater treatment process of this invention.

Although as shown above with reference to FIGS. 1 and 9, system 10, includes weighting agent impregnation subsystem 26, 26' which receives mixed liquor from biological reactor 12 and then dispenses the weighted biological flocs back into the biological reactor, this is not a necessary limitation of this invention. In other designs, weighting agent impregnation subsystem 26, 26', may receive mixed liquor from biological reactor 12 and dispense the weighted biological flocs between biological reactor and the secondary clarifier. For example, system 10''', FIG. 11, where like parts have been given like numbers, may include weighting impregnation subsystem 26, 26', similar as discussed above with reference to FIGS. 1 and 4, which dispenses the weighted biological flocs to line 137 between biological reactor 12 and clarifier 46.

Figure 12:
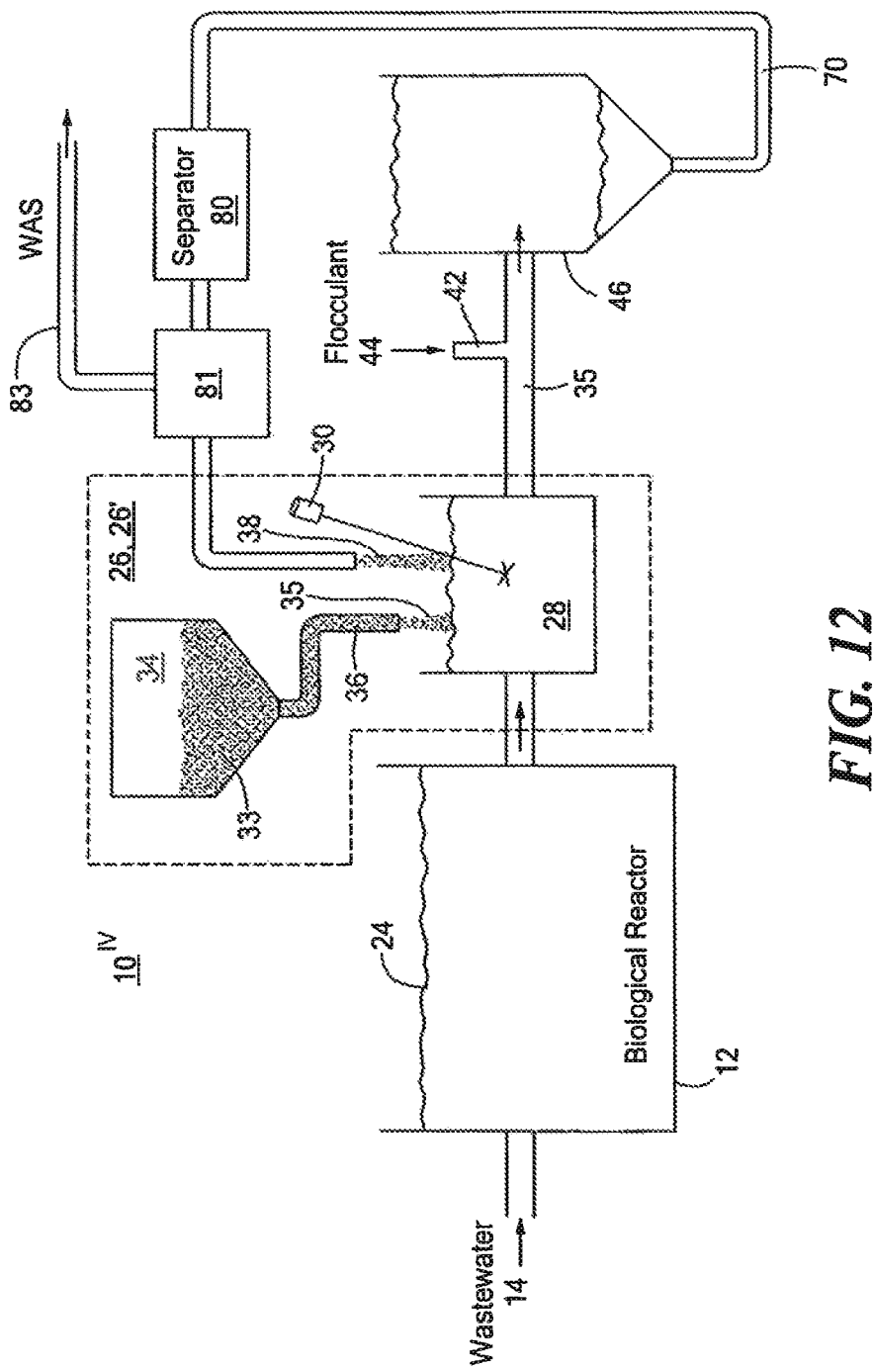
FIG. 12 is a schematic side-view of yet another embodiment of the system for enhancing a wastewater treatment process of this invention.

In other designs, weighting agent impregnation subsystem 26, 26' may be located between the biological reactor and the secondary clarifier. For example, system $10^{IV}$, FIG. 12, where like parts have been given like numbers, includes weighting agent impregnation subsystem 26, 26' located between biological reactor 12 and clarifier 46. In this example, wastewater 14 may be from a brewery processing system or similar type processing system which has a high concentration of biodegradable organic matter in the incoming wastewater 14. In this design, system $10^{IV}$ may not need return activated sludge subsystem 70, a shown in FIG. 9, because enough organisms are grown from the removal of influent organic matter to maintain a suitable population of microorganisms in the mixed liquor 24.

Figure 13:
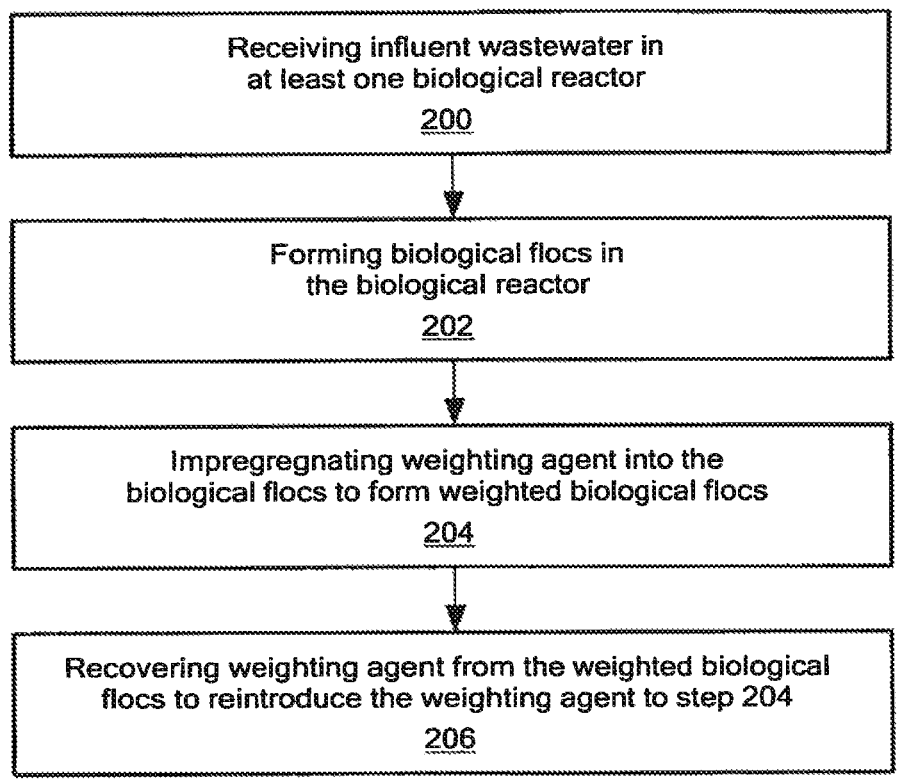
FIG. 13 is a schematic block diagram showing one embodiment of the primary steps of the method for enhancing a wastewater treatment process of this invention.

The method for enhancing a wastewater treatment process, in one embodiment of this invention, includes receiving a flow of wastewater in at last one biological reactor, step 200, FIG. 13. Biological flocs are then formed in the biological reactor, step 202. Weighting agent is then impregnated into the biological flocs to form weighted biological flocs, step 204. The weighting agent is then recovered and reintroduced to step 204, step 206. The details of the operation of steps 200-206 are discussed in detail above with reference to FIGS. 1-9.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for providing a treated effluent comprising:
   a biological reactor connected to a source of wastewater;
   a weighting agent impregnation tank connected to a first outlet and an inlet of the biological reactor;
   a source of a weighting agent connected to a first inlet of the weighting agent impregnation tank;
   a clarifier fluidly connected downstream from a second outlet of the biological reactor;
   a separator connected to an outlet of the clarifier and a second inlet of the weighting agent impregnation tank, the weighting agent impregnation tank is fluidly connected downstream from the second outlet of the biological reactor and upstream of an inlet of the clarifier.

2. The system of claim 1, wherein the weighting agent comprises magnetite.

3. The system of claim 1, further comprising an outlet of the separator connected to a wasting subsystem.

4. The system of claim 1, wherein the weighting agent has a particle size less than about 100 μm.

5. The system of claim 4, wherein the weighting agent has a particle size less than about 40 μm.

6. The system of claim 5, wherein the weighting agent has a particle size less than about 20 μm.

7. The system of claim 1, wherein the separator is selected from the group consisting of a shear mill, a centrifugal separator, an ultrasonic separator, and a wet drum magnetic separator.

8. The system of claim 1, further comprising a weighting agent feeder subsystem connected to the first inlet of the weighting agent impregnation tank.

9. The system of claim 1, wherein the biological reactor comprises an aeration tank.

10. The system of claim 1, wherein the biological reactor comprises an anaerobic reactor.

11. The system of claim 1, wherein the biological reactor comprises an anoxic zone and an anaerobic zone.

12. The system of claim 1, further comprising a source of flocculant fluidly connected to at least one of the source of wastewater and the second outlet of the biological reactor.

13. The system of claim 1, further comprising a source of coagulant fluidly connected to at least one of the biological reactor and the weighting agent impregnation tank.

\* \* \* \* \*